(12) United States Patent
Choi et al.

(10) Patent No.: US 8,284,707 B2
(45) Date of Patent: Oct. 9, 2012

(54) HYBRID POWER-SAVING MECHANISM FOR VOIP SERVICES

(75) Inventors: Hyun-Ho Choi, Dajeon (KR); Dong-Ho Cho, Seoul (KR); Doo Seok Kim, Pleasanton, CA (US)

(73) Assignee: Qualcomm Incorporated, San Diego, CA (US)

( * ) Notice: Subject to any disclaimer, the term of this patent is extended or adjusted under 35 U.S.C. 154(b) by 859 days.

(21) Appl. No.: 11/982,886

(22) Filed: Nov. 5, 2007

(65) Prior Publication Data
US 2008/0107056 A1    May 8, 2008

Related U.S. Application Data

(60) Provisional application No. 60/857,527, filed on Nov. 7, 2006.

(51) Int. Cl.
*G08C 17/00* (2006.01)

(52) U.S. Cl. ........................................ 370/311

(58) Field of Classification Search .................... 370/311
See application file for complete search history.

(56) References Cited

U.S. PATENT DOCUMENTS

| | | | | |
|---|---|---|---|---|
| 5,530,700 | A * | 6/1996 | Tran et al. | 370/461 |
| 6,308,081 | B1 * | 10/2001 | Kolmonen | 455/522 |
| 6,381,451 | B1 | 4/2002 | Parisel et al. | |
| 6,463,307 | B1 | 10/2002 | Larsson et al. | |
| 6,480,476 | B1 * | 11/2002 | Willars | 370/311 |
| 6,577,862 | B1 * | 6/2003 | Davidson et al. | 370/433 |
| 7,110,416 | B2 * | 9/2006 | Selin | 370/433 |
| 7,319,680 | B2 * | 1/2008 | Cho | 370/329 |
| 7,564,810 | B2 | 7/2009 | Hernandez et al. | |
| 7,586,949 | B1 * | 9/2009 | Barany et al. | 370/474 |
| 2002/0042284 | A1 * | 4/2002 | Benoist et al. | 455/522 |
| 2005/0064818 | A1 | 3/2005 | Assarsson et al. | |
| 2006/0009266 | A1 | 1/2006 | Hara et al. | |
| 2006/0029011 | A1 | 2/2006 | Etemad et al. | |
| 2006/0293885 | A1 * | 12/2006 | Gournay et al. | 704/223 |
| 2007/0072578 | A1 * | 3/2007 | Lee et al. | 455/343.1 |
| 2007/0298836 | A1 * | 12/2007 | Yanover | 455/552.1 |
| 2010/0014430 | A1 * | 1/2010 | Oka | 370/242 |

(Continued)

FOREIGN PATENT DOCUMENTS

EP    1292039 A2    3/2003

(Continued)

OTHER PUBLICATIONS

International Search Report and Written Opinion of the International Searching Authority Dated Mar. 14, 2008, International Application No. PCT/US2007/23546.

(Continued)

*Primary Examiner* — Derrick Ferris
*Assistant Examiner* — Saad A Waqas
(74) *Attorney, Agent, or Firm* — Tyler Overall

(57) ABSTRACT

An embodiment of the invention is a technique for power saving in mobile communication. At least one of a base station (BS) and a mobile station (MS) is initialized for power saving using a downlink (DL) status and an uplink (UL) status associated with the BS and the MS, respectively, during communication between the BS and the MS. A first PSC mode is entered when both the DL and UL statuses indicate a silence period. A second PSC mode is entered when at least one of the DL and UL statuses indicates a talk period.

34 Claims, 14 Drawing Sheets

U.S. PATENT DOCUMENTS

2011/0090859 A1* 4/2011 Wakabayashi ................ 370/329

FOREIGN PATENT DOCUMENTS

| | | |
|---|---|---|
| JP | 2002524961 A | 8/2002 |
| JP | 2003179539 A | 6/2003 |
| JP | 2006521731 A | 9/2006 |
| RU | 2137305 C1 | 9/1999 |
| RU | 2313123 C2 | 12/2007 |
| WO | WO9529568 A1 | 11/1995 |
| WO | WO2005064818 A1 | 7/2005 |
| WO | WO2006040769 | 4/2006 |
| WO | WO2006049460 A1 | 5/2006 |
| WO | WO2006071096 | 7/2006 |
| WO | WO2006132469 | 12/2006 |

OTHER PUBLICATIONS

A. Estapa, et al., "A New Approach for VoIP Traffic Characterization," IEEE Commun. Letters, vol. 8, No. 10, pp. 644-646, Oct. 2004.

ITU-T Recommendation G723.1 Annex A, "Silence compression scheme," Nov. 1996.

ITU-T Recommendation G729 Annex B, "A silence compression scheme for G729 optimized for terminals conforming to Recommendation V.70," Nov. 1996.

Vladimir Yanover, "Sleep Mode Generic Mechanism", IEEE C802.16e-04/459r2, IEEE 802.16 Broadband Wireless Access Working Group, Nov. 12, 2004.

* cited by examiner

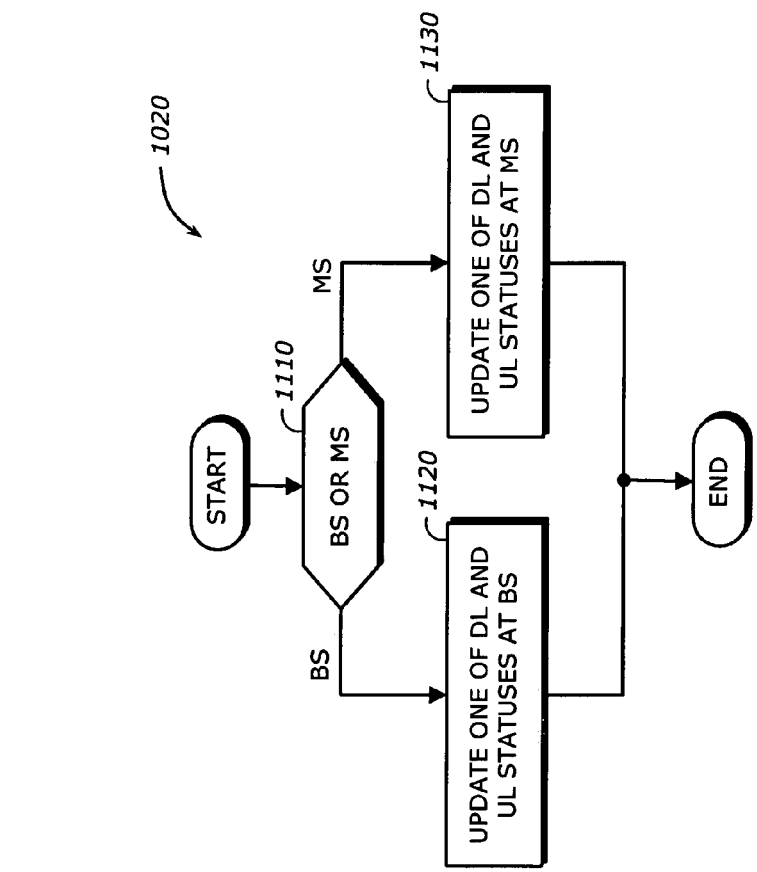
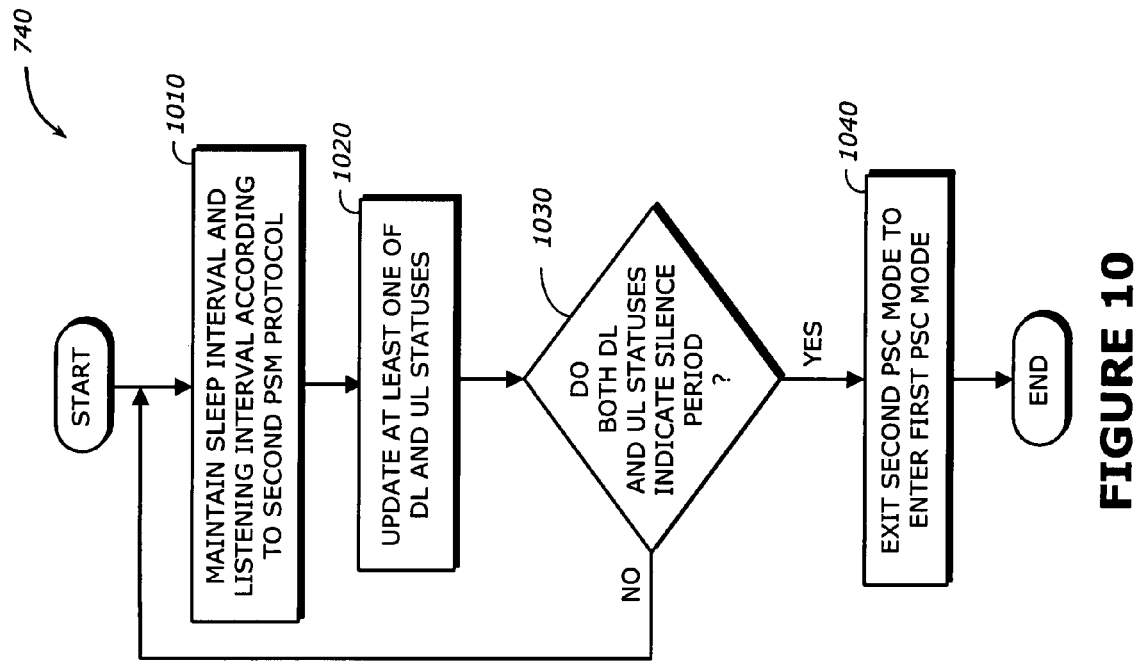

HYBRID POWER-SAVING MECHANISM FOR VOIP SERVICES

RELATED APPLICATION

This application claims benefit of the Provisional Application, filed on Nov. 7, 2006, Ser. No. 60/857,527, titled, "Hybrid Power-Saving Mechanism for VoIP Services".

BACKGROUND

1. Field of the Invention

Embodiments of the invention relate to Worldwide Interoperability for Microwave Access (WiMAX) power-saving systems. In particular, embodiments of the invention are related to Mobile WiMAX systems.

2. Description of Related Art

Current enhanced voice codecs, such as G.723.1A, G.729B, and 3GPP Adaptive Multi Rate (AMR), can use a silence suppression scheme that prevents voice packets from being transmitted during silent periods in order to eliminate wasted bandwidth. Statistically silent periods occupy about 60 percent of the total duration of a voice over Internet Protocol (VoIP) call. Therefore the mobile station (MS) can save more energy if it can sleep during those periods. However, the conventional Power Saving Class (PSC) II used for VoIP services does not consider the silent periods of VoIP traffic, so the MS must wake up periodically during the silent periods even though it receives no voice packets.

SUMMARY OF INVENTION

An embodiment of the invention is a technique for power saving in mobile communication. At least one of a base station (BS) and a mobile station (MS) is initialized for power saving using a downlink (DL) status and an uplink (UL) status associated with the BS and the MS, respectively, during communication between the BS and the MS. A first PSC mode is entered when both the DL and UL statuses indicate a silence period. A second PSC mode is entered when at least one of the DL and UL statuses indicates a talk period.

BRIEF DESCRIPTION OF THE DRAWINGS

Embodiments of invention may best be understood by referring to the following description and accompanying drawings that are used to illustrate embodiments of the invention. In the drawings:

FIG. 10 is a flowchart to illustrate a process to enter the second PSC mode according to one embodiment of the invention.

FIG. 11 is a flowchart to illustrate a process to update one of the DL and UL statuses in the second PSC mode according to one embodiment of the invention.

DESCRIPTION

An embodiment of the invention is a technique for power saving in mobile communication. At least one of a base station (BS) and a mobile station (MS) is initialized for power saving using a downlink (DL) status and an uplink (UL) status associated with the BS and the MS, respectively, during communication between the BS and the MS. A first PSC mode is entered when both the DL and UL statuses indicate a silence period. A second PSC mode is entered when at least one of the DL and UL statuses indicates a talk period.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Figure 1:
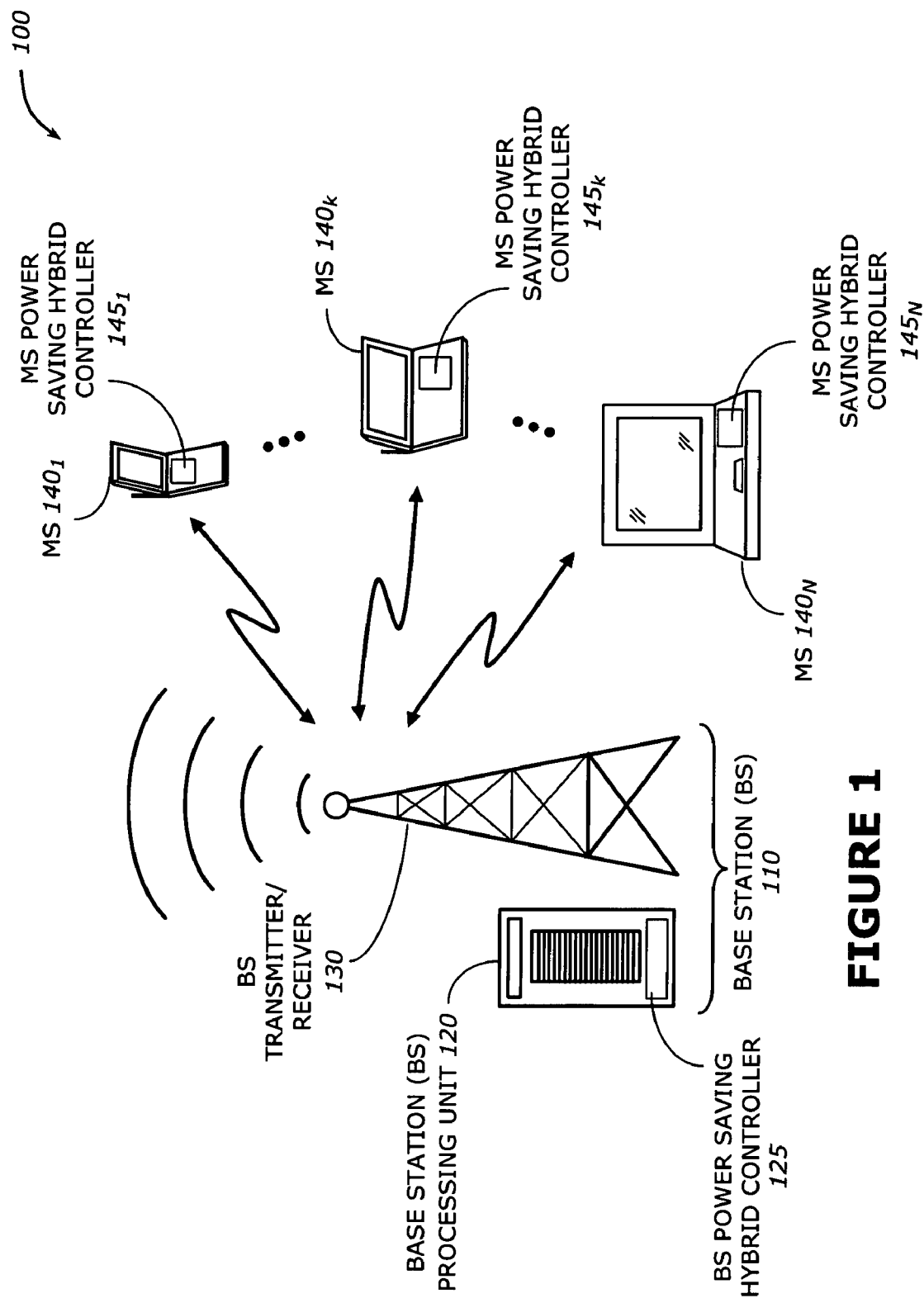
FIG. 1 is a diagram illustrating a system according to one embodiment of the invention.

FIG. 1 is a diagram illustrating a system 100 according to one embodiment of the invention. The system 100 includes a base station (BS) 110 and N mobile stations (MSs) $140_1$ to $140_N$. Note that the system 100 may include more or less than the above components.

The BS 110 is a station installed at a fixed or mobile location to communicate with the N MSs $140_1$ to $140_N$ in a wireless communication mode via radio frequency (RF) transmission. The wireless communication may conform to a Worldwide Interoperability for Microwave Access (WiMAX) standard. The location may be at a sparsely or densely populated area, or may be for vehicular uses. The BS 110 includes a BS processing unit 120 and a BS transmitter/receiver 130.

The BS processing unit 120 includes necessary components for BS operations. It may include an oscillator to provide clock sources or signals to various components in the unit, such as analog-to-digital converter (ADC), digital-to-analog converter (DAC), and other logic circuits; one or more processors such as digital signal processor (DSP), to perform various functions or execute programs; automatic gain control (AGC), automatic frequency control (AFC), and channel encoding/decoding modules or circuits, etc. The BS processing unit includes a BS power saving hybrid controller 125 to provide power saving control features to the BS 110.

The BS transmitter/receiver 130 may include transmitting unit and receiving unit to transmit and receive RF signals. It may include a high powered antenna. The antenna may be mounted on a rooftop, tower, or hilltop depending on the type or terrain and the desired coverage area.

The N MSs 140$_1$ to 140$_N$ may include any MS device such as a handset, a cellular phone, a personal digital assistant (PDA), a notebook computer, a laptop computer, or any device that is capable of performing MS functionality in a wireless communication network. Each of the N MSs 140$_1$ to 140$_N$ may subscribe for mobile communication services provided by the BS 110. Each of the N MSs 140$_1$ to 140$_N$ may include a radio frequency (RF) receiver to receive a radio signal carrying a sequence of symbols from the BS 110 in an orthogonal frequency division multiple access (OFDMA) wireless communication, a power saving hybrid controller 145$_i$ (i=1, . . . , N), a frame detection and synchronizer, a cyclic prefix (CP) remover to remove the CP, a fast Fourier Transform (FFT) processor to compute the FFT, a channel equalizer, a channel estimator, a decoder, a de-interleaver, and other circuits or modules to perform receiving functions. Each of the N MSs 140$_1$ to 140$_N$ may also include channel coder and interleaver, Binary Phase Shift Keying (BPSK) mapper, inverse FFT (IFFT) processor, cyclic prefix and windowing processing unit, and RF transmitter, and other circuits or modules to perform transmitting functions.

Figure 2:
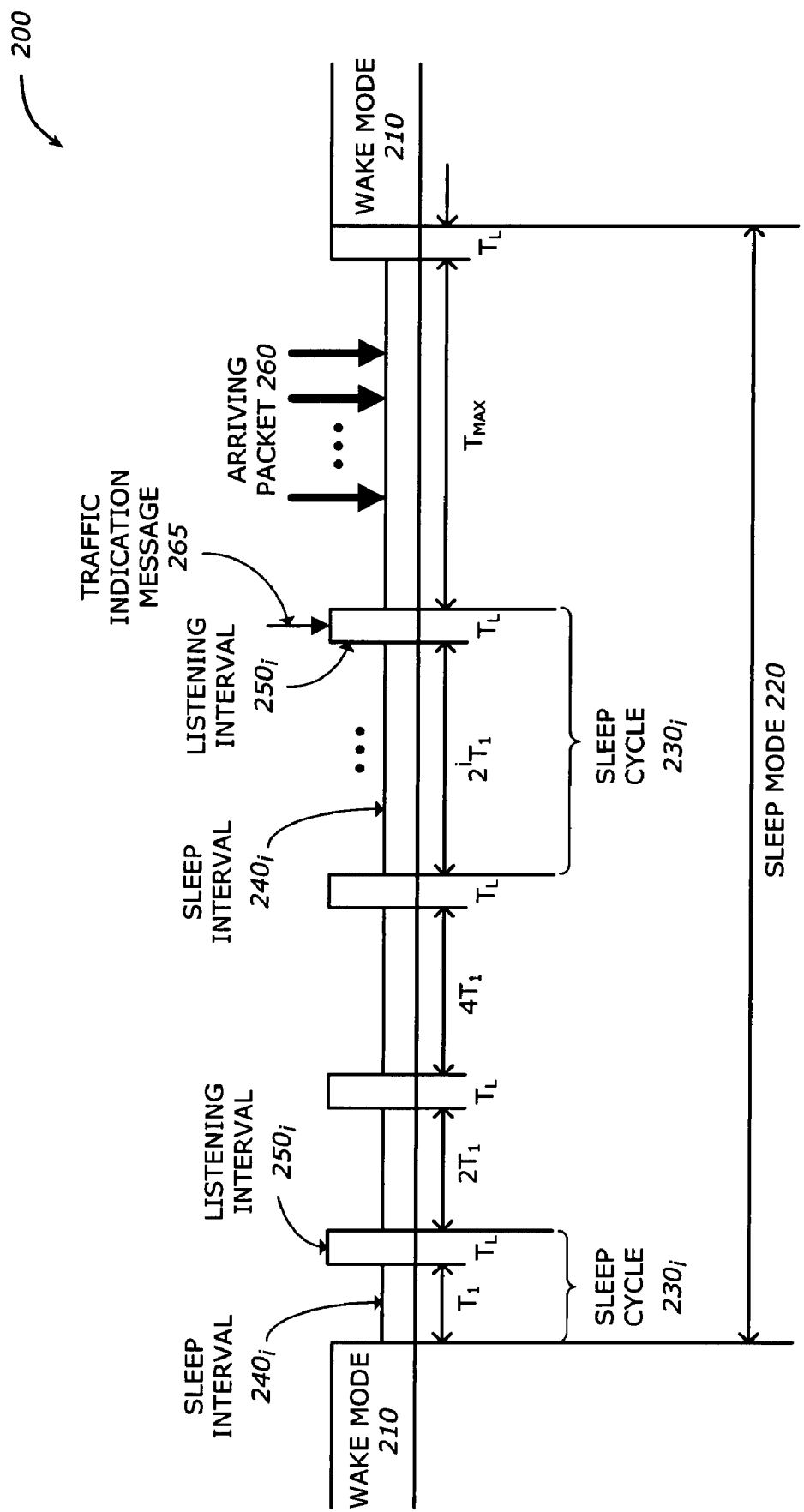
FIG. 2 is a timing diagram illustrating a first power saving mode according to one embodiment of the invention.

The BS 110 and the N MSs 140$_1$ to 140$_N$ communicate with one another under a predefined communication protocol or standard. In one embodiment, the communication standard is the Institute of Electrical and Electronics Engineers (IEEE) 802.16e standard or European Telecommunications Standards Institute (ETSI) High Performance Radio Metropolitan Area Network (HiperMAN) 1.3.2 standard. The BS power saving hybrid controller 125 and the MS power saving hybrid controllers 145$_i$'s provide an efficient power saving using a hybrid scheme that combines several power saving class modes provided by the IEEE 802.16e standard. The BS 110 and the N MSs 140$_1$ to 140$_N$ may include Medium Access Control (MAC) and Physical layer (PHY) features in a typical WiMAX system. The Mobile WiMAX system uses the Orthogonal Frequency Division Multiple Access (OFDMA) scheme for multi-path environments. It may provide VoIP services and a power saving mode (PSM). The hybrid power saving scheme employed by the BS 110 or any one of the N MSs 140$_1$ to 140$_N$ combines a first PSM and a second PSM FIG. 2 is a timing diagram 200 illustrating a first power saving mode (PSM) according to one embodiment of the invention. The timing diagram 200 includes a wake mode 210 and a sleep mode 220.

The wake mode 210 corresponds to an active period where the BS 110 or the MS 140 performs its normal functions such as transmitting or receiving communication packets to and/or from the other device. The sleep mode 220 corresponds to a power saving period where the BS or the MS 140 reduces its power consumption. The sleep mode 220 may include a number of sleep cycles 230$_i$'s (i=1, . . . , K). Each sleep cycle includes a sleep interval or window 240$_i$ and a listening interval or window 250$_i$. For brevity, in the following the subscript "i" may be dropped. There are three parameters used by the first PSM: an initial or minimum sleep time ($T_{min}$), a final or maximum sleep time ($T_{max}$), and a listening time ($T_L$). These parameters are typically pre-negotiated with the other device during the initial period or at the beginning of their communication.

During the sleep interval 240, the BS 110 or the MS 140 turns off most of the circuit elements to reduce power consumption. This results in longer operational period and increase battery life. During the sleep interval 240, the BS 110 or the MS 140 may not receive or transmit any data. During the listening interval 250, the BS 110 or the MS 140 synchronizes with the MS 140 or the BS 110, respectively, to receive short data or a traffic indication message.

At the beginning of the sleep mode, during the initial sleep cycle 230$_1$, the sleep time interval $T_1$ 240$_1$ is equal to the minimum sleep time $T_{min}$, i.e., $T_1 = T_{min}$. The length of the sleep time interval $T_i$ increases binary exponentially until it approaches, but does not exceed the final, or maximum, sleep time $T_{max}$. When the final, or maximum, sleep time $T_{max}$ is reached, the device maintains the sleep time at this $T_{max}$ value. In other words, the sleep time interval in the i-th sleep cycle 230$_i$ is given by the following:

$$T_i = \begin{cases} 2^{i-1} T_{min} & \text{if } 2^{i-1} T_{min} < T_{max} \\ T_{max} & \text{otherwise} \end{cases} \quad (1)$$

In one embodiment, the sleep time interval in the i-th sleep cycle 230$_i$ is modified slightly from (1) as follows:

$$T_i + T_L = \begin{cases} 2^{i-1}(T_{min} + T_L) & \text{if } 2^{i-1}(T_{min} + T_L) < T_{max} + T_L \\ T_{max} + T_L & \text{otherwise} \end{cases} \quad (2)$$

During the listening interval 250, the BS 110 or the MS 140 wakes up for a time equal to the listening time $T_L$. The listening time $T_L$ is constant throughout the sleep mode 220. It may be a short interval of about one MAC frame length. During the listening interval 250, the device (i.e., the BS 100 or the MS 140) listens to the traffic indication transmitted from the other device. For example, the MS 140 listens to determine if a traffic indication message 265 is broadcast from the BS 110. If this message delivers a positive indication, the device exits the sleep mode 220 and returns to the wake mode 210 to receive the buffered packet from the other device.

The first PSM may be suitable for non real-time traffic with bursty behavior such as Web browsing. It may be used to support a best effort (BE) or a non real-time variable rate (NRT-VR) connection. In one embodiment, it is compatible with the PSM protocol of the power saving class (PSC) Type I provided by the IEEE 802.16e standard.

Figure 3:
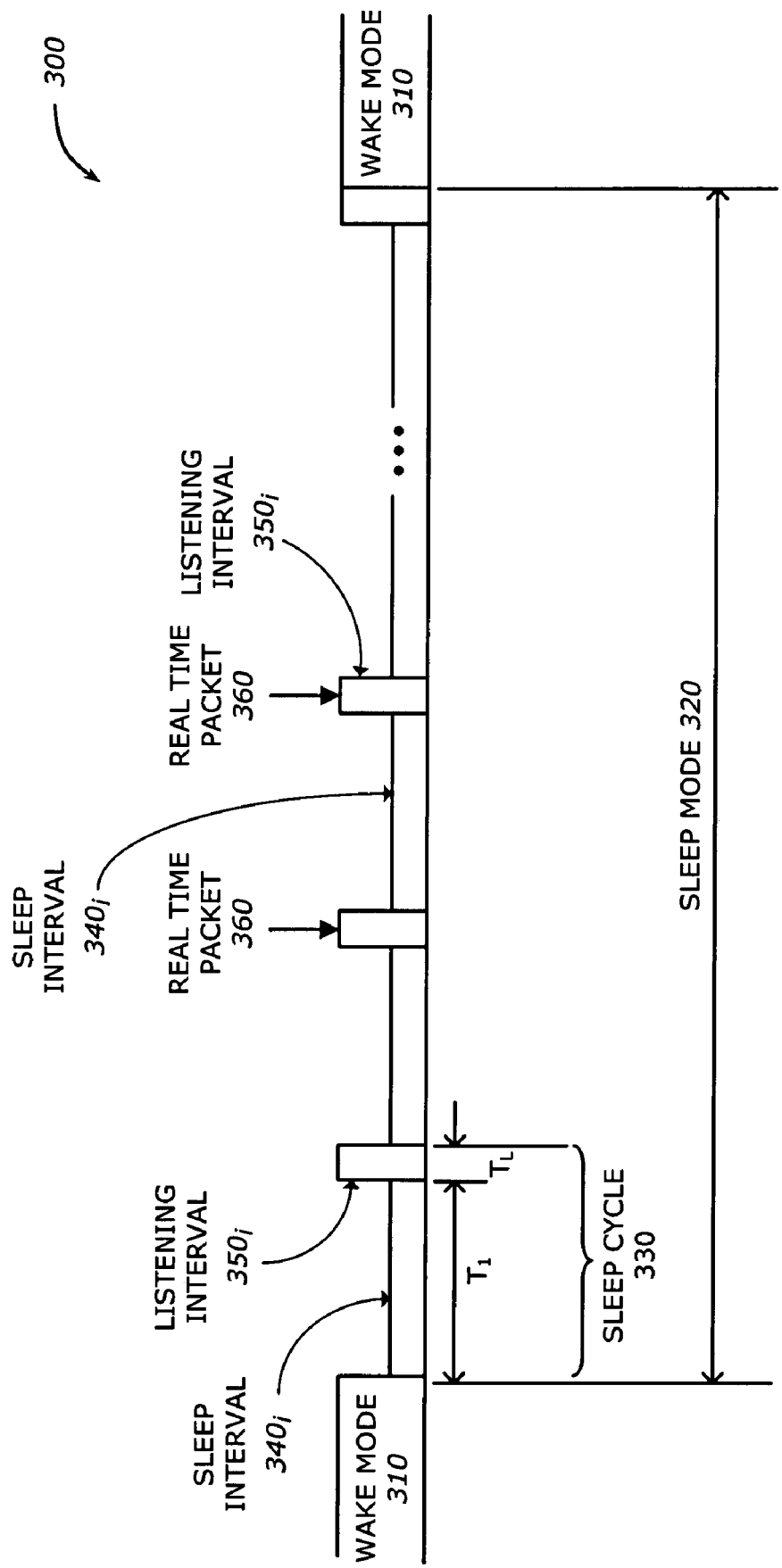
FIG. 3 is a timing diagram illustrating a second power saving mode according to one embodiment of the invention.

FIG. 3 is a timing diagram 300 illustrating a second power saving mode (PSM) according to one embodiment of the invention. The timing diagram 300 includes a wake mode 310 and a sleep mode 320. The wake mode 310 and the sleep mode 320 are similar to the wake mode 210 and the sleep mode 220 shown in FIG. 2.

The wake mode 310 corresponds to an active period where the BS 110 or the MS 140 performs its normal functions such as transmitting or receiving communication packets to and/or from the other device. The sleep mode 320 corresponds to a power saving period where the BS or the MS 140 reduces its power consumption. The sleep mode 320 may include a number of sleep cycles 330$_i$'s (i=1, . . . , K). Each sleep cycle includes a sleep interval or window 340$_i$ and a listening interval or window 350$_i$. For brevity, in the following the subscript "i" may be dropped. There are two parameters used by the second PSM: an initial or minimum sleep time ($T_{min}$) and a listening time ($T_L$). These parameters are typically pre-negotiated with the other device during the initial period or at the beginning of their communication. The initial sleep time $T_{min}$ and the listening time $T_L$ are constant throughout the sleep cycles in the sleep mode 320.

During the sleep interval 340, the BS 110 or the MS 140 turns off most of the circuit elements to reduce power consumption. This results in longer operational period and increase battery life. During the sleep interval 340, the BS 110 or the MS 140 may not receive or transmit any data.

During the listening interval 350, the BS 110 or the MS 140 wakes up for a time equal to the listening time $T_L$. The listening time $T_L$ is constant throughout the sleep mode 220. It may be a short interval of about one MAC frame length. During the listening interval 350, the device (i.e., the BS 100 or the MS 140) does not transmit the traffic indication message. Instead, the BS 110 and the MS 140 directly exchange with each other their real-time packets 360. Therefore, the sleep mode 320 may be maintained uninterrupted, which is more efficient for real-time traffic because the signal overhead required to restart the sleep mode may be eliminated or reduced significantly. In the second PSM, the sleep mode 320 may be ended as desired by the BS 110 or the MS 140 by sending a specified control message.

The second PSM may be suitable for real-time traffic such as VoIP. It may be used to support an unsolicited grant service (UGS), a real-time variable rate (RT-VR), or an extended real-time variable rate (ERT-VR) connection. In one embodiment, it is compatible with the PSM protocol of the power saving class (PSC) Type II provided by the IEEE 802.16e standard.

Figure 4:
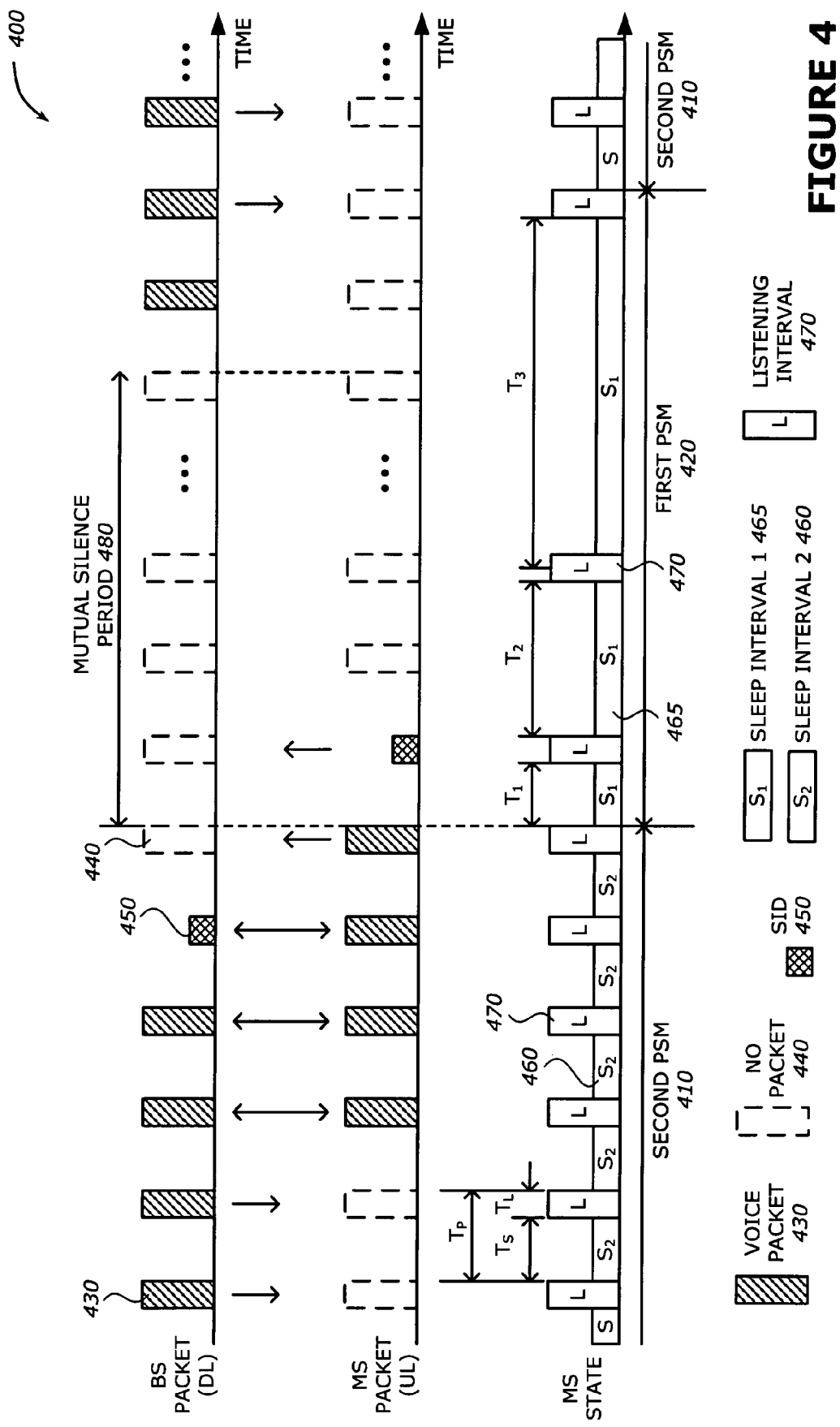
FIG. 4 is a timing diagram illustrating a hybrid power saving mode according to one embodiment of the invention.

FIG. 4 is a timing diagram 400 illustrating a hybrid power saving mode according to one embodiment of the invention. The timing diagram 400 illustrates the MS state for illustrative purposes. A similar diagram may be obtained for the BS state. The timing diagram 400 includes a timing diagram for the BS packet in a downlink (DL) transmission, a timing diagram for the MS packets in an uplink (UL) transmission, and a timing diagram for the MS state. The diagrams show voice packets 430, no packet 440, silence insertion descriptor (SID) frame 450, sleep interval S 460, and listening interval L 470.

The voice packet 430 is generated when a station sends a packet containing a voice communication. The voice codecs of the end users may use a silence suppression scheme. In this scheme, the voice packets 430 are generated periodically during the talk-spurt periods, but are not generated at all during silent periods. At the beginning of a silent period, the voice codec using the silence suppression scheme inserts the SID frame 450. The SID frame 450 is smaller than the voice packet 430. It may include only information about background noise. It may be used to generate artificial noise at the receiving side's decoder during the silent period.

The hybrid power saving mode (HPSM) uses both the first and second PSMs depending on whether there is a mutual silent period 480. A mutual silent period is a period during which both the UL device (e.g., the MS) and the DL device (e.g., the BS) have no voice packets to transmit. In other words, if the silent suppression scheme is used, the mutual silent period 480 may be detected if both the UL device and the DL device transmit their SID frame.

When there is at least a voice packet 430 on DL or UL or both, the HPSM follows the PSM protocol of the second PSM 410 (e.g., the PSC type II). In other words, the station sleeps during the sleep interval 460 with a fixed length $T_S$, and wakes up during the listening interval 470 with a fixed length $T_L$ during which a voice packet 430 may be generated. The sleep cycle $T_P$ is equal to $T_S + T_L$.

During the mutual silent period 480, there is no transmission of voice packets 430. The station applies the PSM protocol of the first PSM 420 (e.g., the PSC type I). In other words, if $T_i$ is the length of the i-th sleep interval 465, then the length of the i-th sleep cycle, $T_i + T_L$, increases exponentially as given in equation (2), repeated below for ease of reference:

$$T_i + T_L = \begin{cases} 2^{i-1}(T_{min} + T_L) & \text{if } 2^{i-1}(T_{min} + T_L) < T_{max} + T_L \\ T_{max} + T_L & \text{otherwise} \end{cases} \quad (2)$$

where $T_{max}$ is the maximum sleep cycle. The minimum or initial sleep cycle is equal to $T_P$.

Note that the first PSM is modified slightly from the PSC Type I, as shown in equation (2), in that the value of the sleep cycle, $T_i + T_L$, is doubled to synchronize with the arrival of the voice packet 430 although only $T_i$ value is doubled in the original PSC Type I.

When the mutual silence period 480 starts, the PSM switches from the second PSM 410 to the first PSM 420. The start of the mutual silence period 480 may be detected by detecting two SID frames coming from the two communicating stations. Each of the BS 110 and the MS 140 may detect if an arriving packet is a SID frame by checking the packet size because the SID frame 450 has much few bits than the voice packet 430.

When a station is in the first PSM 420, it continuously checks for an arriving packet, either from UL or DL, during the listening interval 470. If the packet is the voice packet 430, the station terminates the first PSM 420 and returns to the second PSM 410. If the packet is the SID frame 450, which may be sent by a station, the station waits for the next listening interval 470 and sends the received SID frame 450. In this manner, the arrival of a SID frame 450 during the mutual silence period 480 does not interrupt the operation of the first PSM 420, resulting in a more power efficient operation.

If a voice packet 430 arrives during the sleep interval 465 while the station is in the first PSM 420, it is buffered in a buffer memory and is then forwarded in the next listening interval 470. More than one packet may be buffered and transmitted in the next listening interval 470. In this manner, all buffered packets may be transmitted first to reduce unnecessary buffering delay.

To facilitate the control action that switches the station between the second PSM 410 and the first PSM 420, the station may maintain two status variables or flags that indicate the status of the DL and the UL. The status of the DL and the UL refers to whether a voice packet or an SID frame has been received or transmitted. By checking the DL and UL statuses, the station may detect the mutual silence period 480. A simple rule is that if both the DL and UL statuses indicate that there is a silence period (e.g., when both the BS 110 and MS 140 receive their respective SID frame 450), then the mutual silence period 480 is detected and the PSM associated with the underlying station is the first PSM 420. Otherwise, if at least one of the DL and UL statuses indicates that there is a talk period (e.g., when at least one of the BS 110 and MS 140 receives a voice packet 430), then there is no mutual silence period and the PSM associated with the underlying station is the second PSM 410.

The HPSM may be started by first initializing the DL and UL statuses to a talk status that indicates a talk period. In this way, the second PSM 410 is PSM of the station when the station begins its power saving operation. From this initial second PSM 410, the station may remains in the second PSM 410 or switches to the first PSM 420 according to the DL and UL statuses as discussed above.

Figure 5:
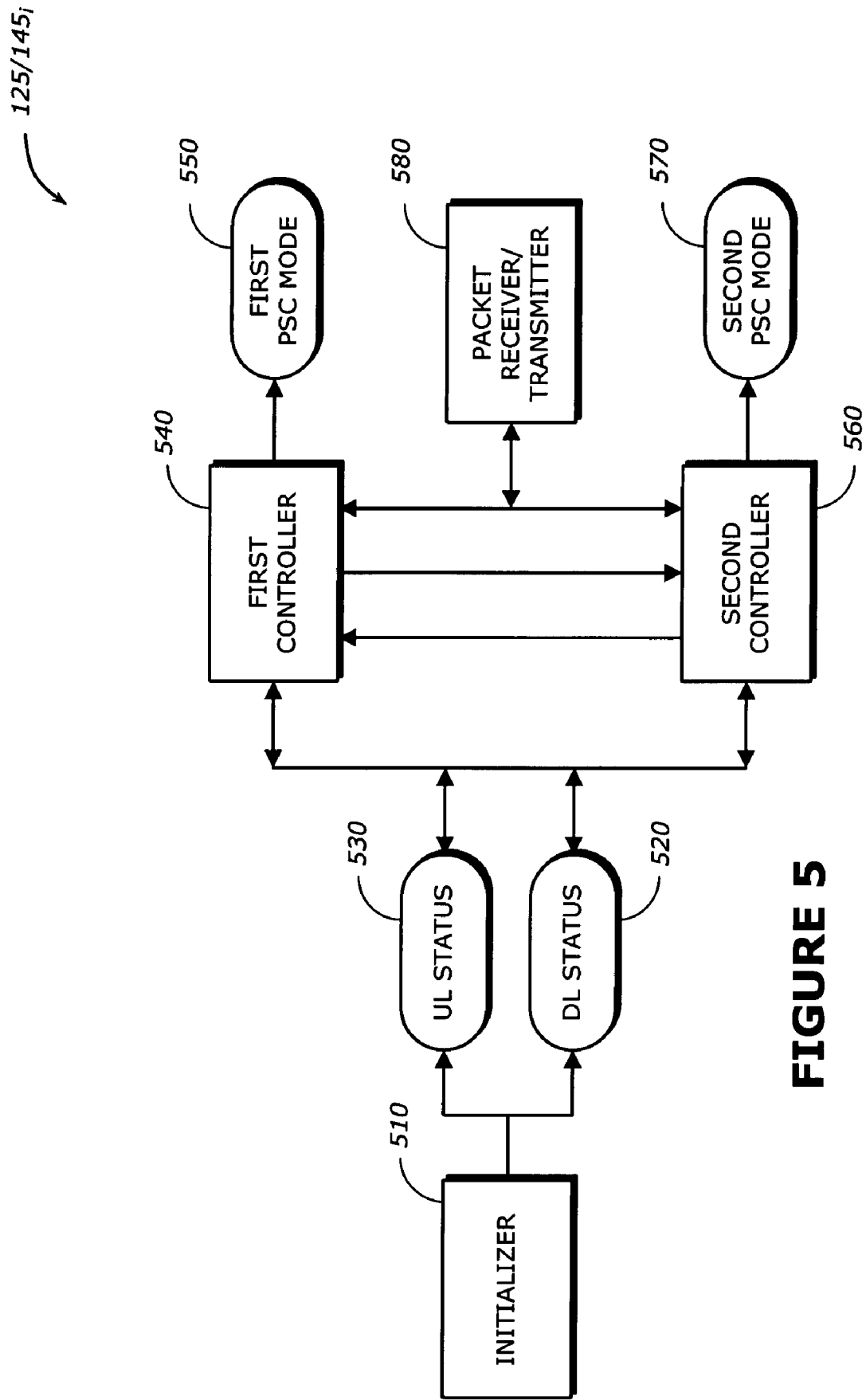
FIG. 5 is a diagram illustrating a power saving hybrid controller according to one embodiment of the invention.

FIG. 5 is a diagram illustrating the power saving hybrid controller 125/145$_i$ shown in FIG. 1 according to one embodiment of the invention. The hybrid controller 125/145$_i$ includes an initializer 510, a first controller 540, a second controller 560, and a packet receiver/transmitter 580. The hybrid controller 125/145$_i$ may have more or less components than the above. In addition, the hybrid controller 125/145$_i$ may be implemented by hardware, firmware, software or any combination of them.

The initializer 510 initializes at least one of a BS 110 and a MS 140 for power saving using a DL status 520 and an UL status 530 associated with the BS 110 and the MS 140, respectively, during communication between the BS 110 and the MS 140. The DL status 520 and the UL status 530 may be stored in a memory which may be accessible to the initializer 510, the first controller 540, and the second controller 560.

The initializer 510 sets both the DL and the UL statuses to indicate the talk period if both a voice over Internet Protocol (VoIP) and power-saving mode (PSM) are desired The first controller 540 is coupled to the initializer 510 to activate a first power-saving class (PSC) mode 550 when both the DL and UL statuses indicate a silence period. Activating the first PSC mode 550 includes maintaining the scheduling of the sleep interval and the listening interval according to the first PSM as discussed above. The first PSC mode 550 may be represented by a timing circuit or a routine that performs the scheduling.

The second controller 560 is coupled to the initializer 510 to activate a second PSC mode 570 when at least one of the DL and UL statuses indicates a talk period. Activating the second PSC mode 570 includes maintaining the scheduling of the sleep interval and the listening interval according to the second PSM as discussed above. The second PSC mode 570 may be represented by a timing circuit or a routine that performs the scheduling.

The packet receiver/transmitter 580 performs the receiving and transmitting functions of a SID frame or a voice packet. It may also check whether a packet is a voice packet or a SID frame and inform the first controller 540 or the second controller 560 accordingly.

Figure 6A:
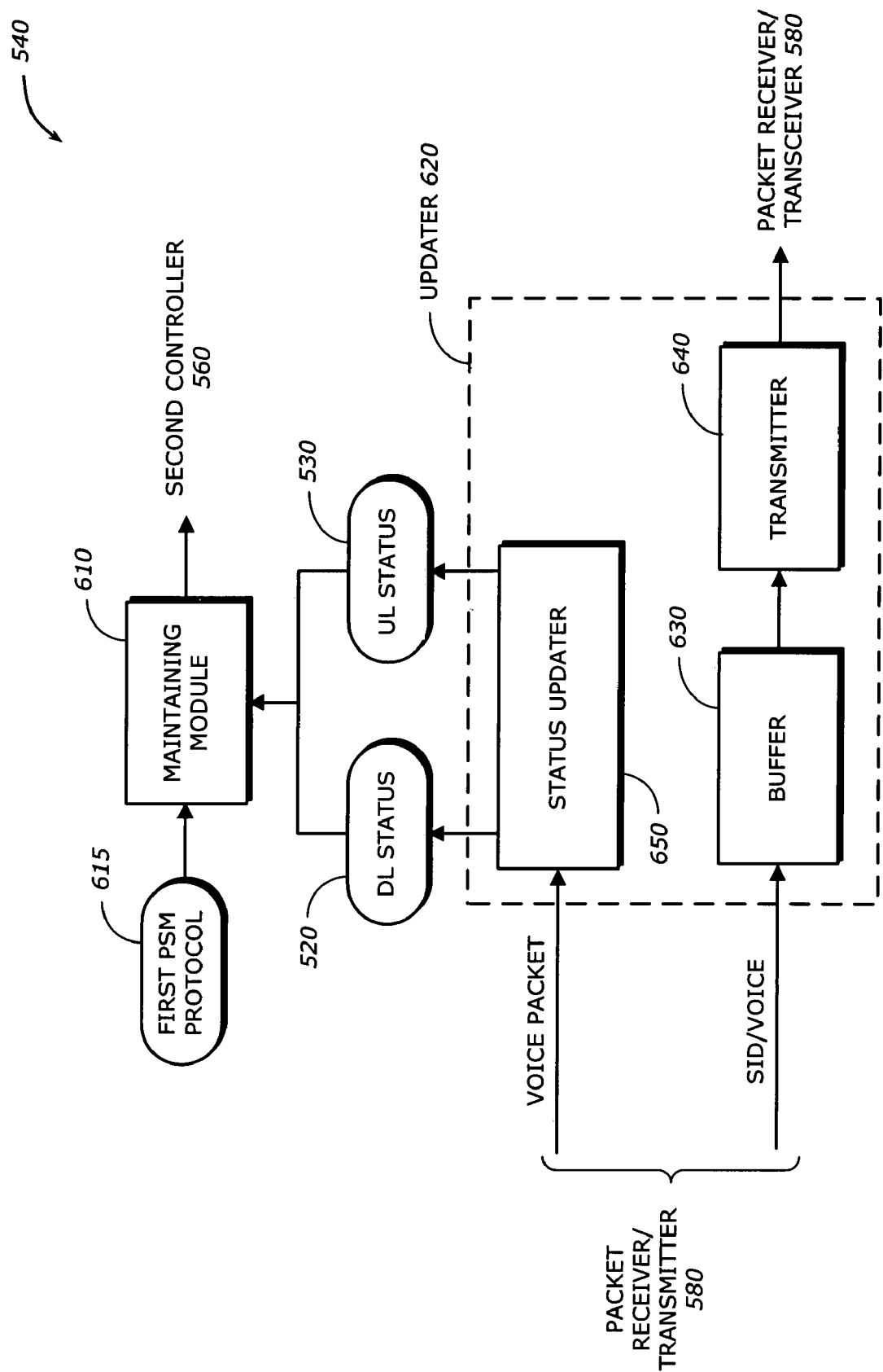
FIG. 6A is a diagram illustrating a first controller according to one embodiment of the invention.

FIG. 6A is a diagram illustrating the first controller 540 shown in FIG. 5 according to one embodiment of the invention. The first controller 540 includes a maintaining module 610 and an updater 620. The first controller 540 may have more or less components than the above.

The maintaining module 610 maintains a sleep interval and a listening interval according to a first PSM protocol 615 if both the DL and UL statuses 520 and 530 (FIG. 5) indicate the silence period. In one embodiment, the first PSM protocol 615 is the protocol of the PSC Type I as provided by the IEEE 802.16e or an equivalent standard. The maintaining module 610 also communicates with the second controller 560 if it is determined that the PSM is changed from the first PSM to the second PSM, in which case the maintaining module 610 de-activates the first PSM protocol 615.

The updater 620 updates at least one of the DL and UL statuses 520 and 530. This may be performed by monitoring or determining the type of packet as provided by the packet receiver/transmitter 580 (FIG. 5). The updater 620 includes a status updater 650, a buffer 630, and a transmitter 640.

The status updater 650 updates one of the DL and UL statuses 520 and 530 at the BS 110 or at the MS 140 if a voice packet is received or transmitted. The buffer 630 buffers a silence insertion descriptor (SID) frame or a voice packet. The buffer 630 may be implemented as a buffer memory (e.g., first-in-first-out device, random access memory). The size of the buffer 630 may be large enough to hold all the packets that may arrive. The transmitter 640 transmits the buffered SID frame or the buffered voice packet during the listening interval. The transmitter 640 sends the buffered SID frame or the buffered voice packet to the packet receiver/transmitter 580.

Figure 6B:
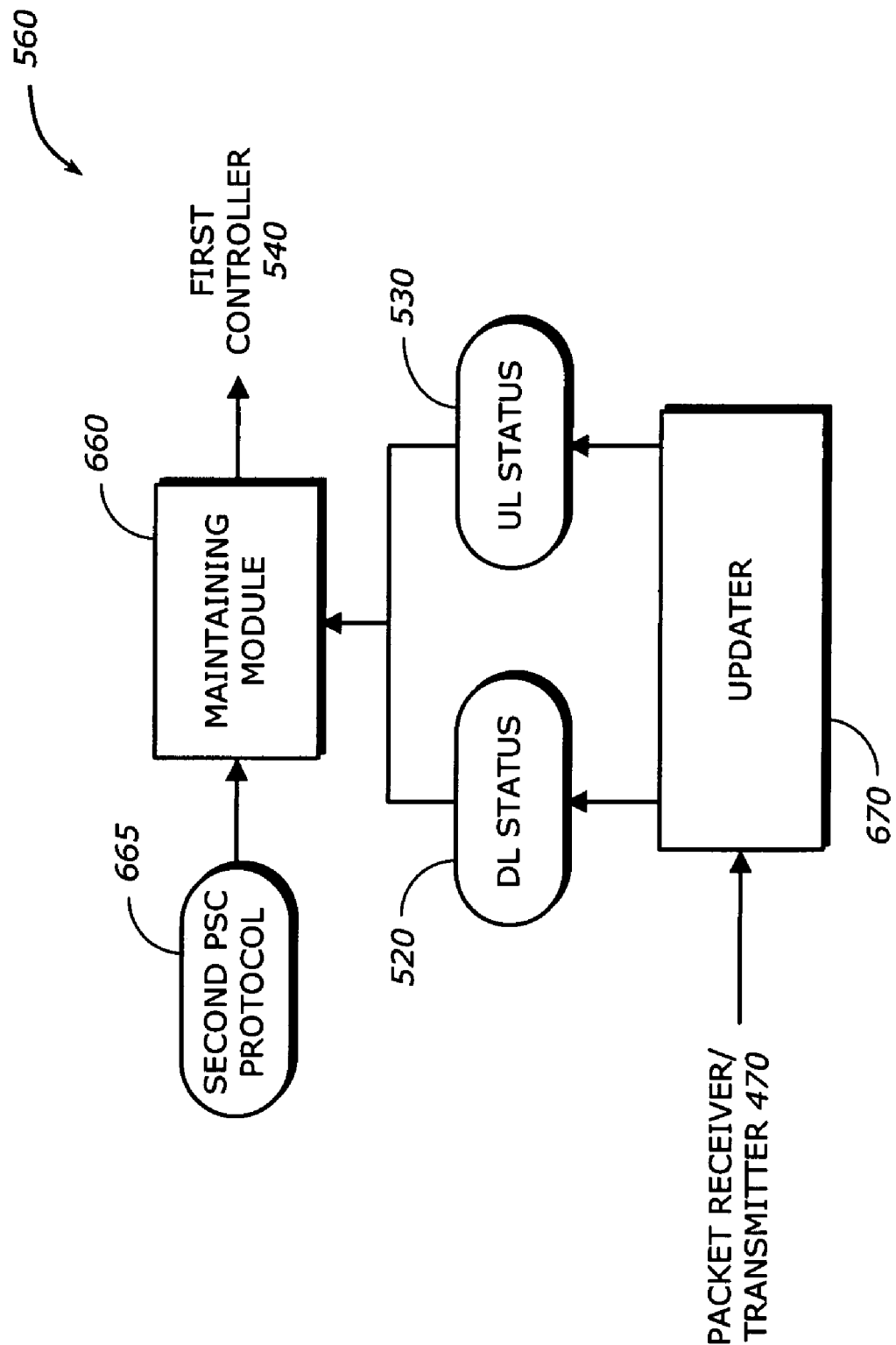
FIG. 6B is a diagram illustrating a second controller according to one embodiment of the invention.

FIG. 6B is a diagram illustrating the second controller 560 shown in FIG. 5 according to one embodiment of the invention. The second controller 560 includes a maintaining module 660 and an updater 670. The second controller 560 may have more or less than the above components.

The maintaining module 660 maintains a sleep interval and a listening interval according to a second PSM protocol 665 if at least one of the DL and UL statuses indicates the talk period. In one embodiment, the second PSM protocol 665 is the protocol of the PSC Type II as provided by the IEEE 802.16e or an equivalent standard. The maintaining module 660 also communicates with the first controller 540 if it is determined that the PSM is changed from the second PSM to the first PSM, in which case the maintaining module 660 de-activates the second PSM protocol 665.

The updater 670 updates at least one of the DL and UL statuses 530 and 530 (FIG. 5). This may be performed by monitoring or determining the type of packet as provided by the packet receiver/transmitter 580 (FIG. 5).

Figure 7:
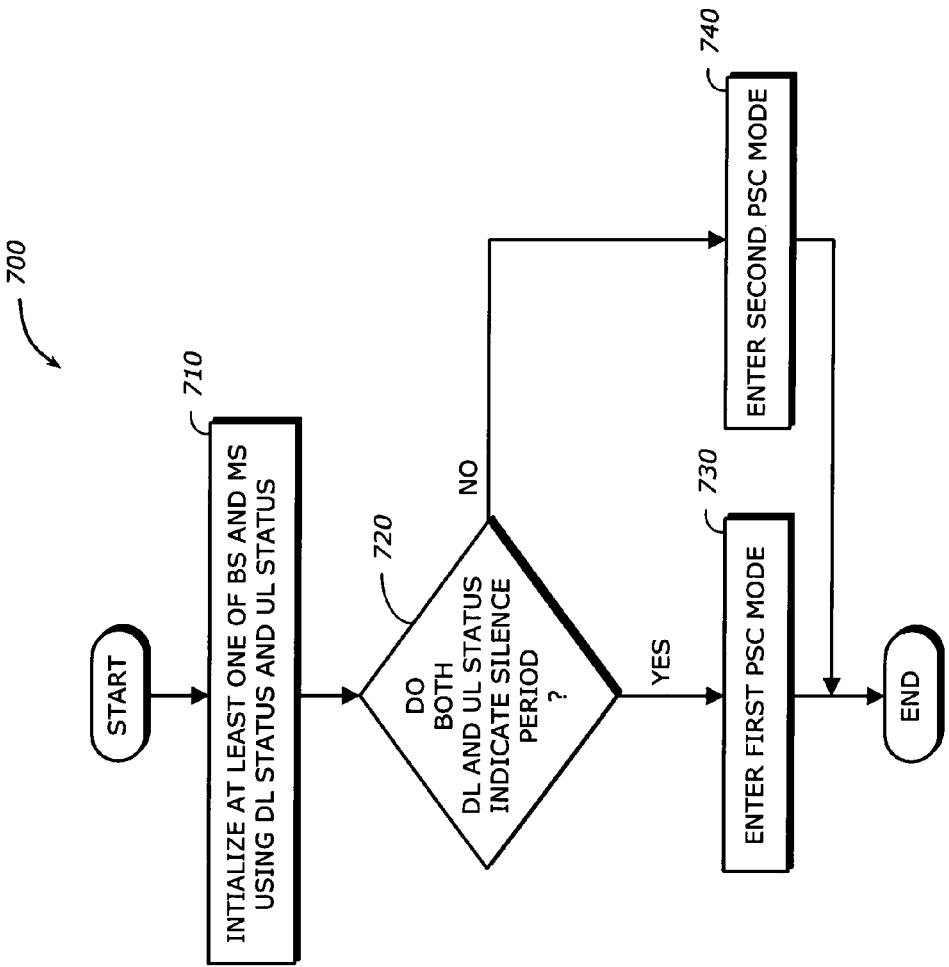
FIG. 7 is a flowchart to illustrate a process to save power according to one embodiment of the invention.

FIG. 7 is a flowchart to illustrate a process 700 to save power according to one embodiment of the invention.

Upon START, the process 700 initializes at least one of a BS and a MS for power saving using a DL status and an UL status associated with the BS and the MS, respectively, during communication between the BS and the MS (Block 710). Next, the process 700 determines if both the DL and UL statuses indicate a silence period (Block 720). If so, the process 700 enters a first PSC mode (Block 730) and is then terminated. Otherwise, the process 700 enters the second PSC mode and is then terminated. In one embodiment, the first PSC mode supports a best effort (BE) or a non real-time variable rate (NRT-VR) connection and the second PSC mode supports an unsolicited grant service (UGS), a real-time variable rate (RT-VR), or an extended real-time variable rate (ERT-VR) connection. In one embodiment, the first PSC mode corresponds to a PSC type I and the second PSC mode corresponds to a PSC type II according to an IEEE 802.16e or an equivalent standard.

Figure 8:
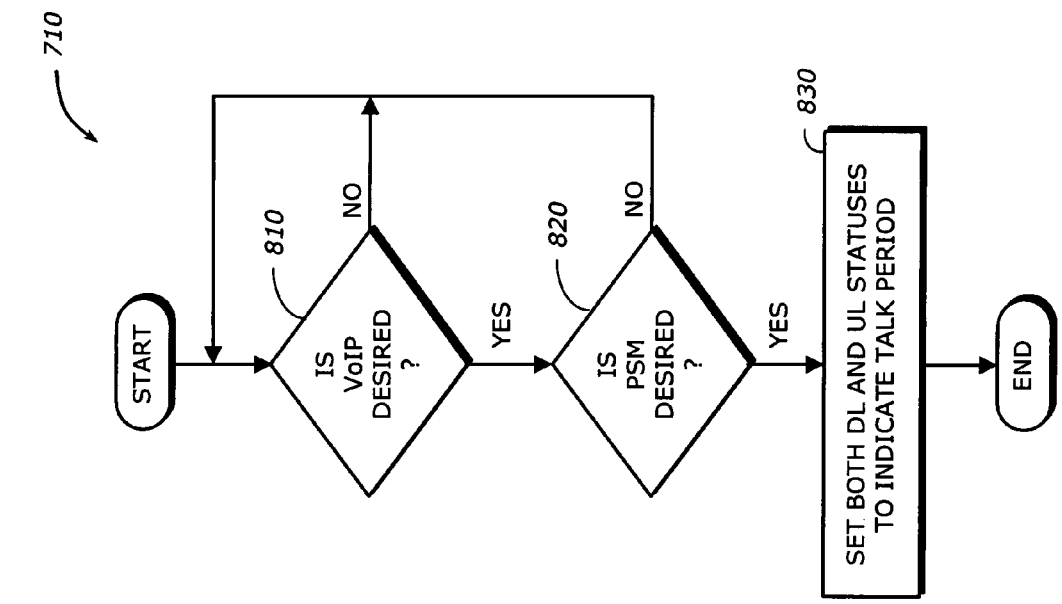
FIG. 8 is a flowchart to illustrate a process to initialize according to one embodiment of the invention.

FIG. 8 is a flowchart to illustrate the process 710 shown in FIG. 7 to initialize according to one embodiment of the invention.

Upon START, the process 710 determines if a voice over Internet Protocol (VoIP) is desired (Block 810). If not, the process 710 returns to Block 810. Otherwise, the process 710 determines if power-saving mode (PSM) is desired (Block 820). If not, the process 710 returns to Block 810 (or Block 820). Otherwise, the process 710 sets both the DL and the UL statuses to indicate the talk period (Block 830) and is then terminated.

Figure 9A:
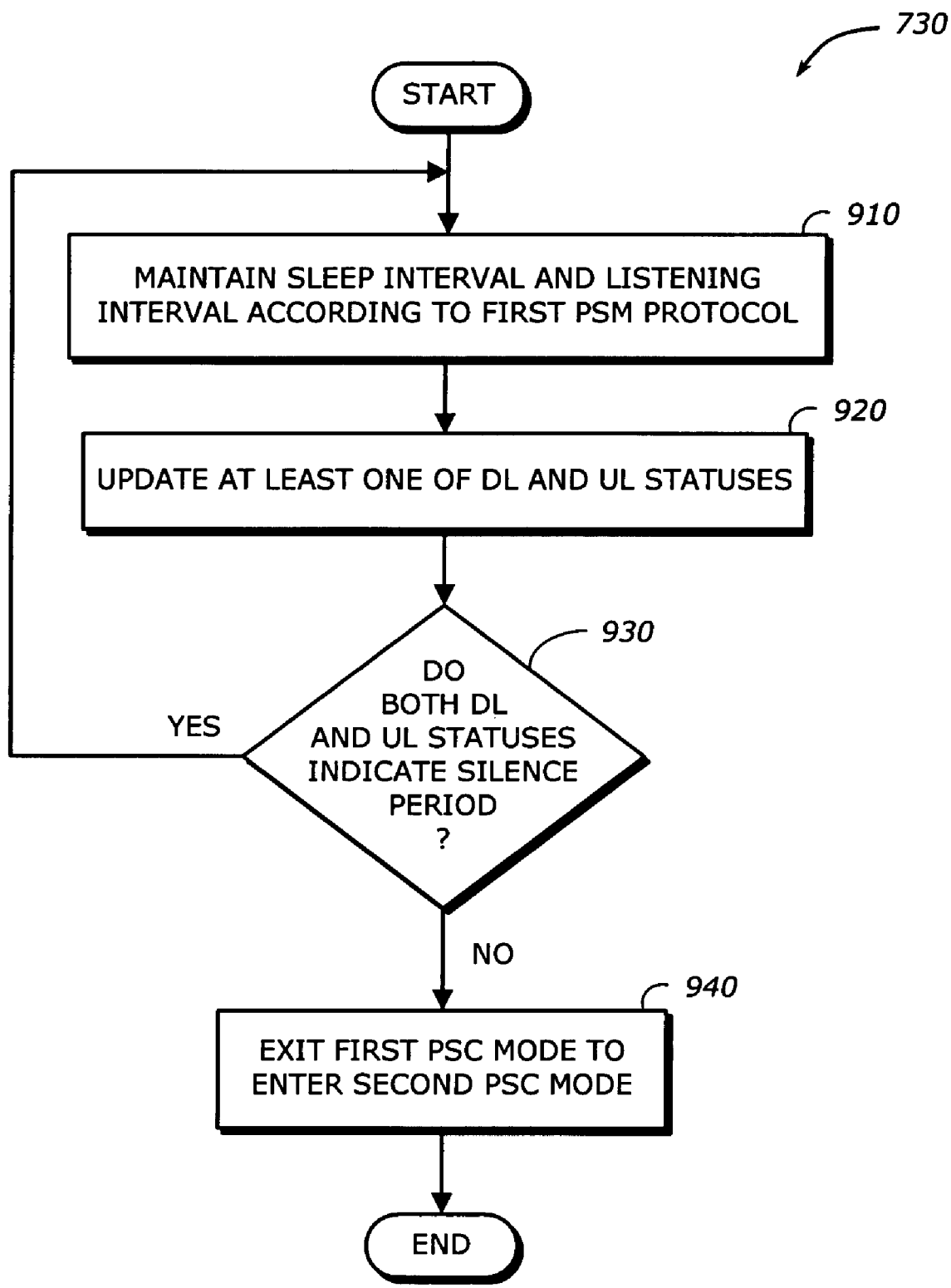
FIG. 9A is a flowchart to illustrate a process to enter the first PSC mode according to one embodiment of the invention.

FIG. 9A is a flowchart to illustrate the process 730 shown in FIG. 7 to enter the first PSC mode according to one embodiment of the invention.

Upon START, the process 730 maintains a sleep interval and a listening interval according to a first PSM protocol (Block 910). Then, the process 730 updates at least one of the DL and UL statuses (Block 920). Next, the process 730 determines if both the DL and UL statuses indicate a silence period (Block 930). If so, the process 730 returns to Block 910 to continue maintaining the sleep interval and the listening interval according to maintaining the first PSM protocol. Otherwise, if at least one of the DL and UL statuses indicates a talk period, the process 730 exits the first PSC mode to enter the second PSC mode (Block 940) and is then terminated.

Figure 9B:
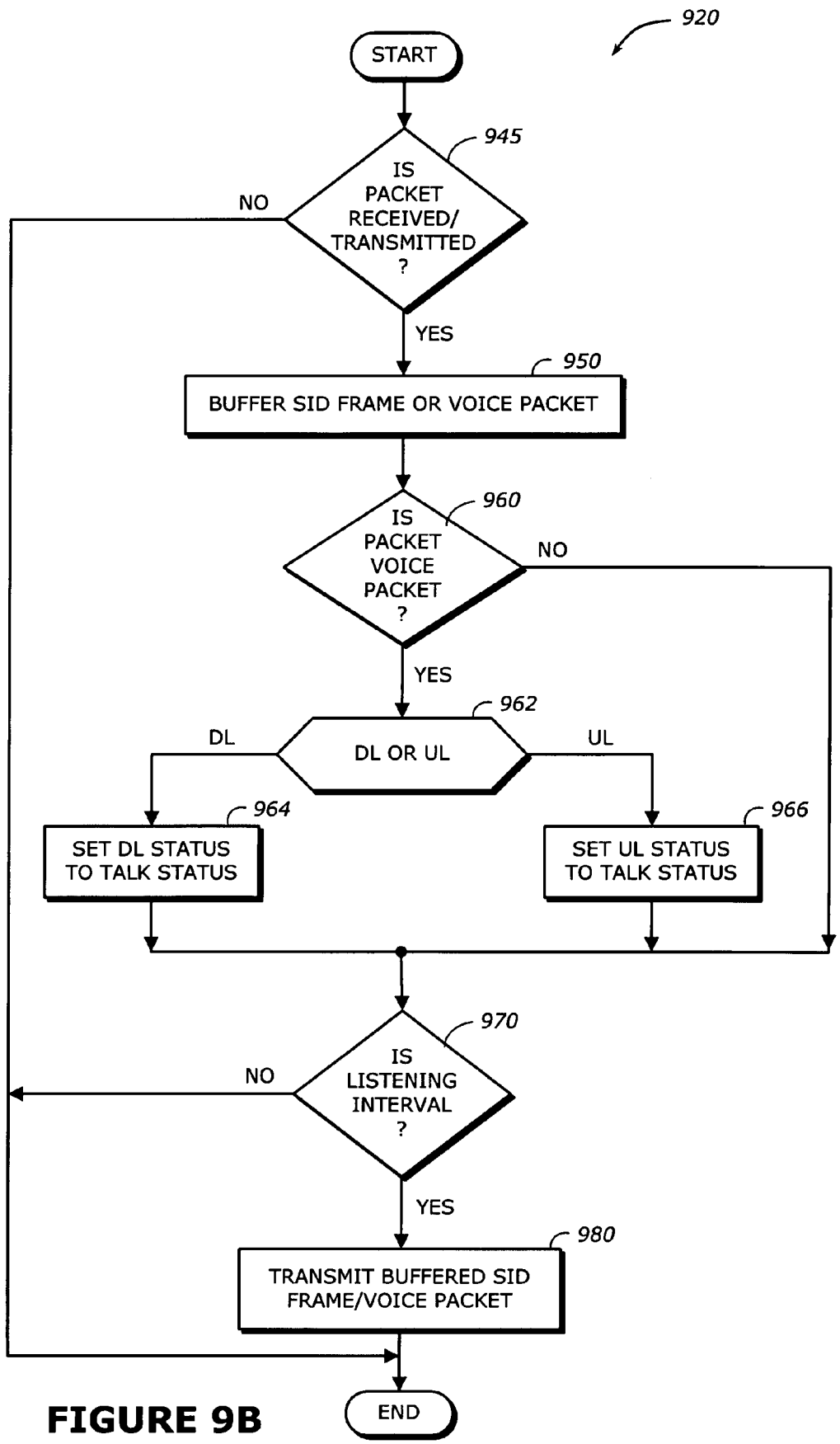
FIG. 9B is a flowchart to illustrate a process to update one of the DL and UL statuses in the first PSC mode according to one embodiment of the invention.

FIG. 9B is a flowchart to illustrate the process 920 shown in FIG. 9A to update one of the DL and UL statuses in the first PSC mode according to one embodiment of the invention.

Upon START, the process 920 determines if a packet is received or transmitted (Block 945). If not, the process 920 is terminated; i.e., no updating of the DL or UL status is necessary. Otherwise, the process 920 buffers the packet which may be a silence insertion descriptor (SID) frame or a voice packet (Block 950). Next, the process 920 determines if the packet is a voice packet (Block 960). If not, i.e., the packet is an SID frame, the process 920 goes to Block 970. Otherwise, the process 920 determines if the packet is from a DL station or an UL station (Block 962). If it is a DL station. i.e., the BS station, the process 920 sets the DL status to a talk status to indicate the talk period (Block 964) and goes to Block 970. If it is an UL station, i.e., the MS station, the process 920 sets the UL status to the talk status (Block 966) and goes to Block 970.

The process 920 then determines if the listening interval has been reached (Block 970). If not, the process 920 is terminated. Otherwise, the process 920 transmits the buffered SID frame or frames or the buffered voice packet or packets during the listening interval (Block 980) and is then terminated.

FIG. 10 is a flowchart to illustrate the process 740 shown in FIG. 7 to enter the second PSC mode according to one embodiment of the invention.

Upon START, the process 740 maintains a sleep interval and a listening interval according to a second PSM protocol (Block 1010). Then, the process 740 updating at least one of the DL and UL statuses (Block 1020). Next, the process 740 determines if both the DL and UL statuses indicate a silence period (Block 1030). If not, i.e., if at least one of the DL and UL statuses indicates the talk period, the process 740 returns to Block 1010 to continue maintaining the sleep interval and the listening interval according to the second PSM protocol. Otherwise, the process 740 exits the second PSC mode to enter the first PSC mode and is then terminated.

FIG. 11 is a flowchart to illustrate the process 1020 shown in FIG. 10 to update one of the DL and UL statuses in the second PSC mode according to one embodiment of the invention.

Upon START, the process 1020 determines if the station is the BS or the MS (Block 1110). If it is the BS, the process 1020 updates one of the DL and UL statuses at the BS (Block 1120) and is then terminated. If it is the MS, the process 1020 updates one of the DL and UL statuses at the MS (Block 1130) and is then terminated.

Figure 12:
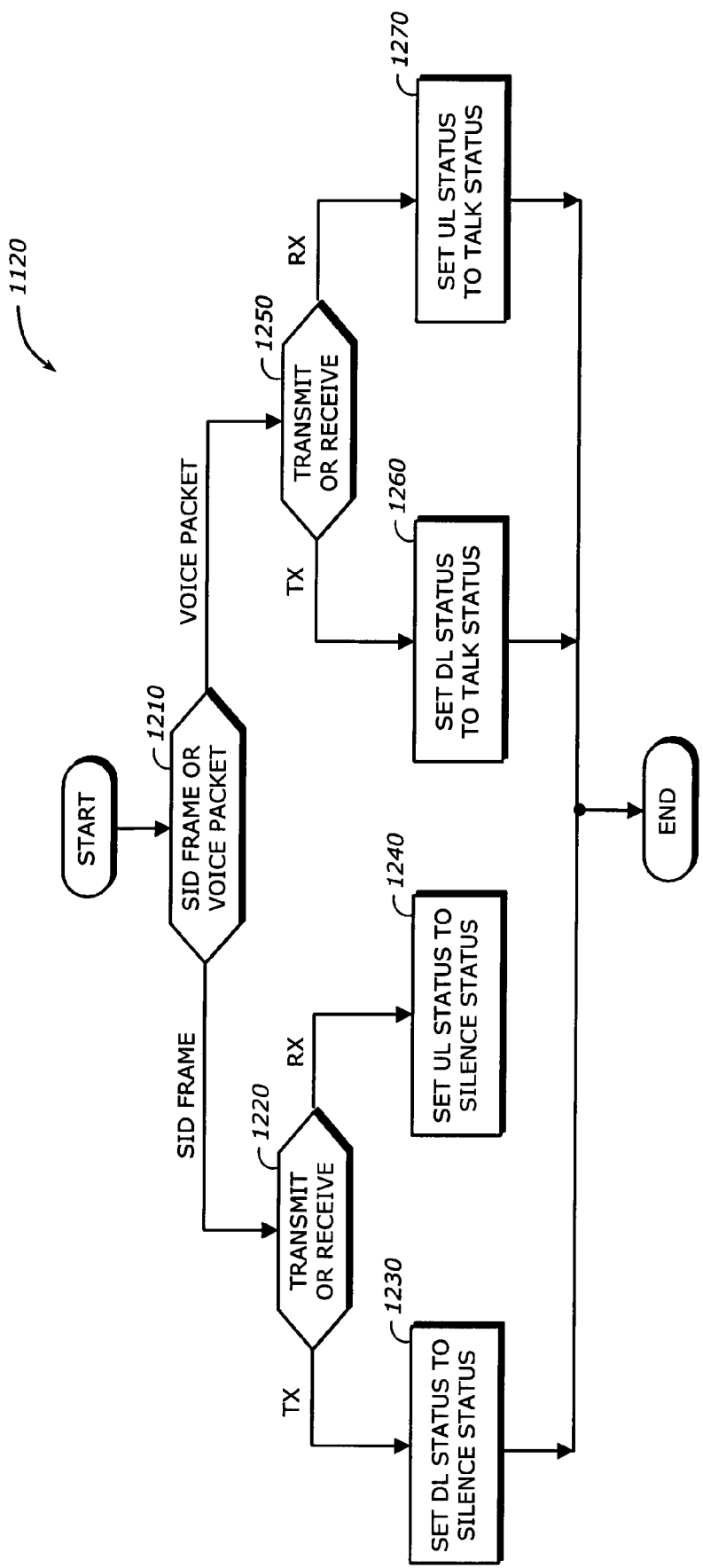
FIG. 12 is a flowchart to illustrate a process to update one of the DL and UL statuses in the second PSC mode at the BS according to one embodiment of the invention.

FIG. 12 is a flowchart to illustrate the process 1120 shown in FIG. 11 to update one of the DL and UL statuses in the second PSC mode at the BS according to one embodiment of the invention.

Upon START, the process 1120 determines if the packet is an SID frame or a voice packet (Block 1210). If it is an SID frame, the process 1120 determines if the packet is transmitted or received to or from the MS (Block 1220). If it is transmitted to the MS, the process 1120 sets the DL status to a silence status to indicate the silence period (Block 1230) and is then terminated. If it is received from the MS, the process 1120 sets the UL status to the silence status (Block 1240) and is then terminated.

If the packet is a voice packet, the process 1120 determines if it is transmitted to the MS or received from the MS (Block 1250). If it is transmitted to the MS, the process 1120 sets the DL status to a talk status to indicate the talk period and is then terminated. If it is received from the MS, the process 1120 sets the UL status to the talk status and is then terminated.

Figure 13:
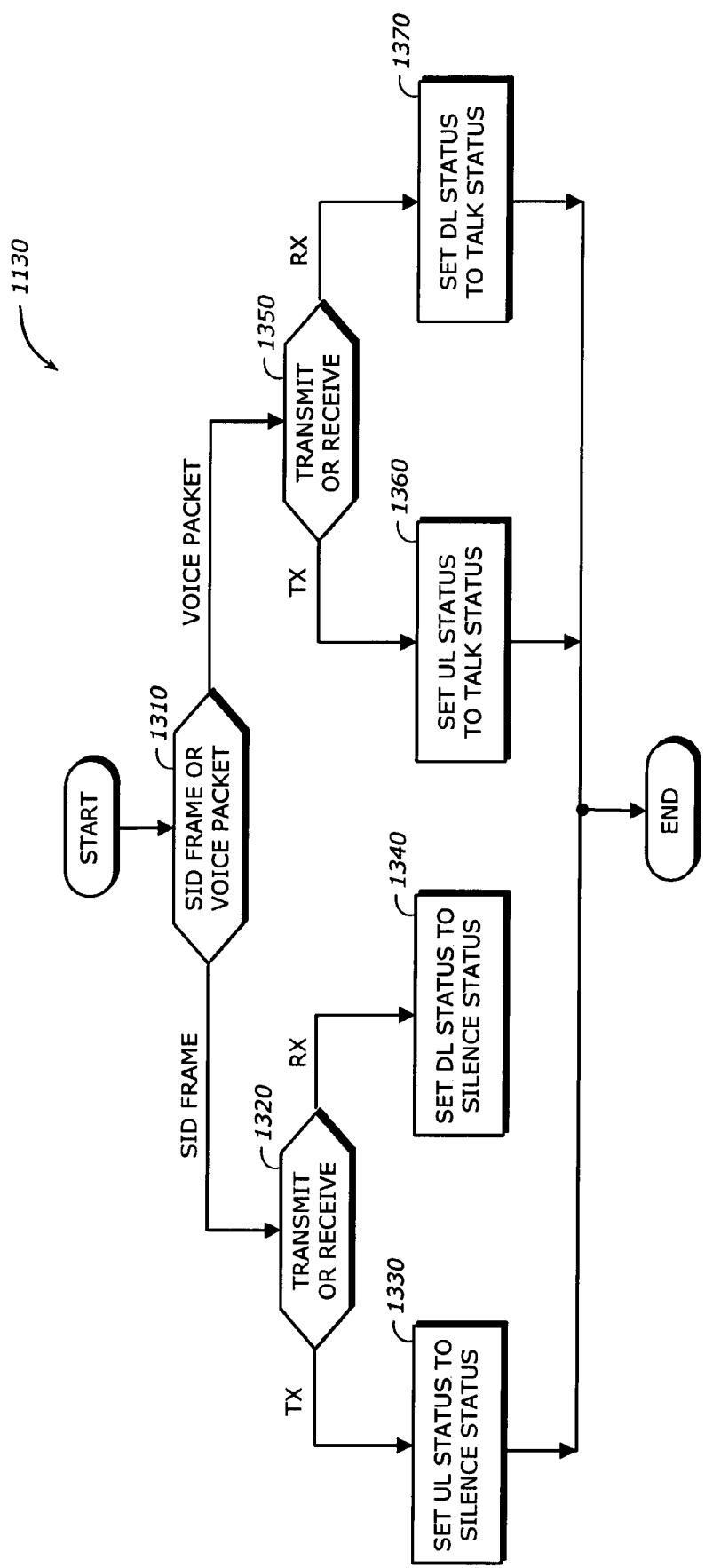
FIG. 13 is a flowchart to illustrate a process to update one of the DL and UL statuses in the second PSC mode at the MS according to one embodiment of the invention.

FIG. 13 is a flowchart to illustrate the process 1130 shown in FIG. 11 to update one of the DL and UL statuses in the second PSC mode at the MS according to one embodiment of the invention.

Upon START, the process 1130 determines if the packet is a SID frame or a voice packet (Block 1310). If it is a SID frame, the process 1130 determines if it is transmitted to the BS or received from the BS (Block 1320). If it is transmitted to the BS, the process 1130 sets the UL status to a silence status to indicate the silence period (Block 1330) and is then terminated. If it is received from the BS, the process 1130 sets the DL status to the silence status (Block 1340) and is then terminated.

If it is a voice packet, the process 1130 determines if it is transmitted to the BS or received from the BS (Block 1350). If it is transmitted to the BS, the process 1130 sets the UL status to a talk status to indicate the talk period (Block 1360) and is then terminated. If it is received from the BS, the process 1130 sets the DL status to the talk status (Block 1370) and is then terminated.

Figure 14:
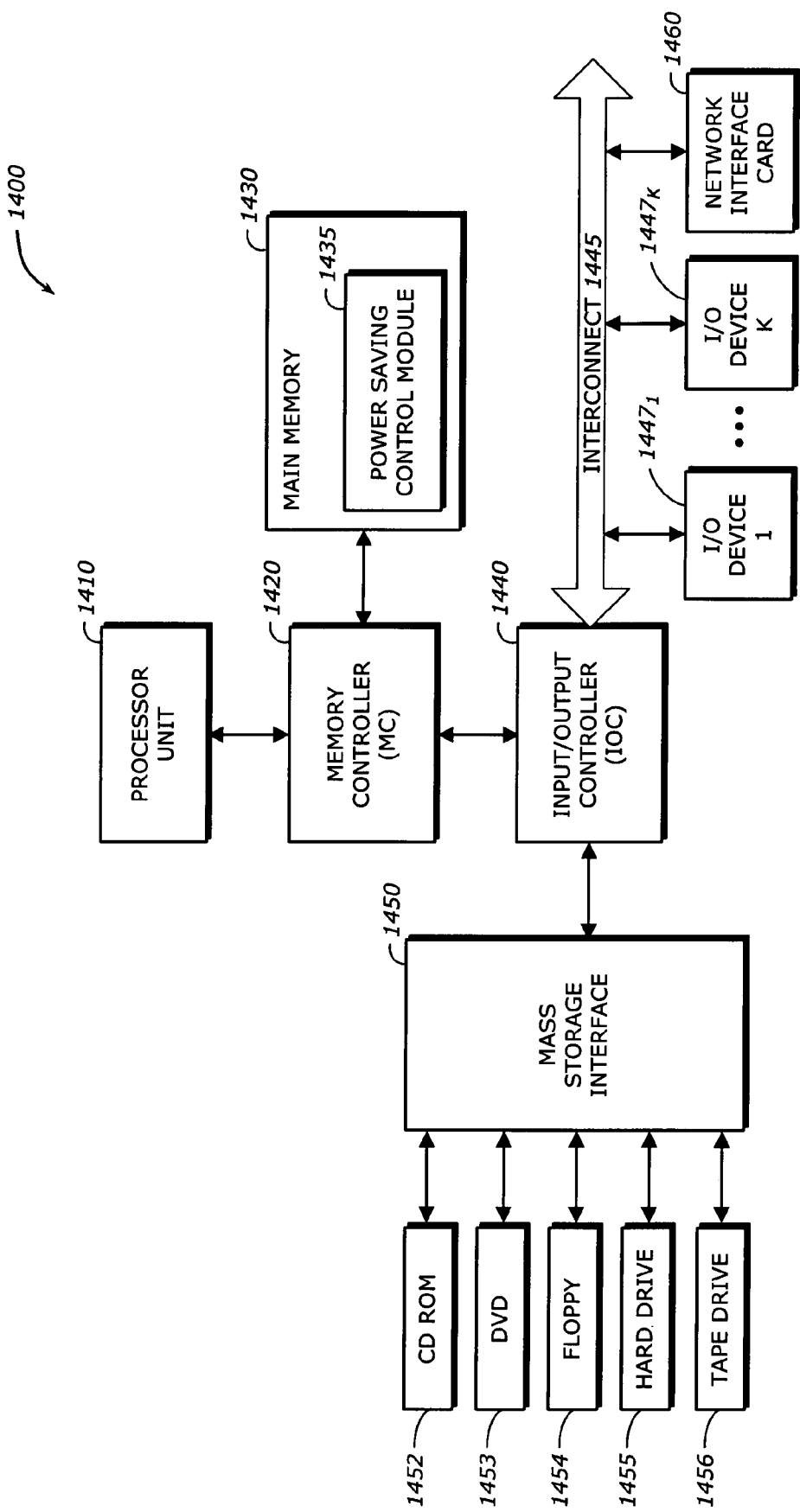
FIG. 14 is a diagram illustrating a processing subsystem to implement the power saving hybrid controller according to one embodiment of the invention.

FIG. 14 is a diagram illustrating a computer system to implement the power saving hybrid controller 125/145; shown in FIG. 1 according to one embodiment of the invention. The processing unit 230 includes a processor 1410, a memory controller (MC) 1420, a main memory 1430, an input/output controller (IOC) 1440, an interconnect 1445, a mass storage interface 1450, input/output (I/O) devices $1447_1$ to $1447_K$, and a network interface card (NIC) 1460. The processing unit 230 may include more or less of the above components.

The processor 1410 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MC 1420 provides control and configuration of memory and input/output devices such as the main memory 1430 and the IOC 1440. The MC 1420 may be integrated into a chipset that integrates multiple functionalities such as graphics, media, isolated execution mode, host-to-peripheral bus interface, memory control, power management, etc. The MC 1420 or the memory controller functionality in the MC 1420 may be integrated in the processor unit 1410. In some embodiments, the memory controller, either internal or external to the processor unit 1410, may work for all cores or processors in the processor unit 1410. In other embodiments, it may include different portions that may work separately for different cores or processors in the processor unit 1410.

The main memory 1430 stores system code and data. The main memory 1430 is typically implemented with dynamic random access memory (DRAM), static random access memory (SRAM), or any other types of memories including those that do not need to be refreshed. The main memory 1430 may include multiple channels of memory devices such as DRAMs. The DRAMs may include Double Data Rate (DDR2) devices with a bandwidth of 8.5 Gigabyte per second (GB/s). In one embodiment, the memory 1430 may include a power saving control module 1435. The power saving control module 1435 may perform all or some of the functions described above.

The IOC 1440 has a number of functionalities that are designed to support I/O functions. The IOC 1440 may also be integrated into a chipset together or separate from the MC 1420 to perform I/O functions. The IOC 1440 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc.

The interconnect 1445 provides interface to peripheral devices. The interconnect 1445 may be point-to-point or connected to multiple devices. For clarity, not all interconnects are shown. It is contemplated that the interconnect 1445 may include any interconnect or bus such as Peripheral Component Interconnect (PCI), PCI Express, Universal Serial Bus (USB), Small Computer System Interface (SCSI), serial SCSI, Direct Media Interface (DMI), and Advanced Microcontroller Bus Architecture (AMBA) etc.

The mass storage interface 1450 interfaces to mass storage devices to store archive information such as code, programs, files, data, and applications. The mass storage interface may include SCSI, serial SCSI, Advanced Technology Attachment (ATA) (parallel and/or serial), Integrated Drive Electronics (IDE), enhanced IDE, ATA Packet Interface (ATAPI), etc. The mass storage device may include high-capacity high speed storage arrays, such as Redundant Array of Inexpensive Disks (RAIDs), Network Attached Storage (NAS), digital tapes, optical storage, etc.

The mass storage device may include compact disk (CD) read-only memory (ROM) 1452, digital video/versatile disc (DVD) 1453, floppy drive 1454, hard drive 1455, tape drive 1456, and any other magnetic or optic storage devices. The mass storage device provides a mechanism to read machine-accessible media.

The I/O devices $1447_1$ to $1447_K$ may include any I/O devices to perform I/O functions. Examples of I/O devices $1447_1$ to $1447_K$ include controller for input devices (e.g., keyboard, mouse, trackball, pointing device), media card (e.g., audio, video, graphic), and any other peripheral controllers.

The NIC 1460 provides network connectivity to the processing unit 230. The NIC 1460 may generate interrupts as part of the processing of communication transactions. In one embodiment, the NIC 1460 is compatible with both 32-bit and 144-bit peripheral component interconnect (PCI) bus standards. It is typically compliant with PCI local bus revision 2.2, PCI-X local bus revision 1.0, or PCI-Express standards. There may be more than one NIC 1460 in the processing system. Typically, the NIC 1460 supports standard Ethernet minimum and maximum frame sizes (64 to 14518 bytes), frame format, and Institute of Electronics and Electrical Engineers (IEEE) 802.2 Local Link Control (LLC) specifications. It may also support full-duplex Gigabit Ethernet interface, frame-based flow control, and other standards defining the physical layer and data link layer of wired Ethernet. It may support copper Gigabit Ethernet defined by IEEE 802.3ab or fiber-optic Gigabit Ethernet defined by IEEE 802.3z.

The NIC 1460 may also be a host bus adapter (HBA) such as a Small Computer System Interface (SCSI) host adapter or a Fiber Channel (FC) host adapter. The SCSI host adapter may contain hardware and firmware on board to execute SCSI transactions or an adapter Basic Input/Output System (BIOS) to boot from a SCSI device or configure the SCSI host adapter. The FC host adapter may be used to interface to a Fiber Channel bus. It may operate at high speed (e.g., 2 Gbps) with auto speed negotiation with 1 Gbps Fiber Channel Storage Area Network (SANs). It may be supported by appropriate firmware or software to provide discovery, reporting, and management of local and remote HBAs with both in-band FC or out-of-band Internet Protocol (IP) support. It may have frame level multiplexing and out of order frame reassembly, on-board context cache for fabric support, and end-to-end data protection with hardware parity and cyclic redundancy code (CRC) support.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. A hardware implementation may include circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include information or data that, when accessed by a machine, cause the machine to perform the operations or actions described above. The machine accessible medium may also include program code embedded therein. The program code may include machine readable code to perform the operations or actions described above. The term "information" or "data" here refers to any type of information that is encoded for machine-readable purposes. Therefore, it may include program, code, data, file, etc.

All or part of an embodiment of the invention may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    initializing at least one of a base station (BS) or a mobile station (MS) to a hybrid power saving mode that utilizes a downlink (DL) status and an uplink (UL) status associated with the at least one of the BS or the MS during communication between the BS and the MS, wherein the DL status indicates status of an associated downlink and the UL status indicates status of an associated uplink;
    entering a first Power Saving Class (PSC) mode based on both the DL status and the UL status indicating a silence period, wherein both the DL status and the UL status indicate the silence period when the at least one of the BS or the MS transmits and receives a silence insertion descriptor (SID) frame; and
    entering a second PSC mode based on at least one of the DL status or the UL status-indicating a talk period,
    wherein operation in the first PSC mode comprises:
        maintaining a sleep interval and a listening interval according to a first power-saving mode (PSM) protocol;
        updating at least one of the DL status or the UL status;
        in response to both of the DL status and the UL status indicating the silence period, maintaining the sleep interval and the listening interval according to the first PSM protocol; and
        in response to at least one of the DL status or the UL status indicating the talk period, exiting the first PSC mode and entering the second PSC mode.

2. The method of claim 1 wherein initializing comprises:
    determining whether a voice over Internet Protocol (VoIP) is desired;
    determining whether a PSM is desired; and
    in response to determining that the VOIP is desired and determining that the PSM is desired, setting both the DL status and the UL status to indicate the talk period.

3. The method of claim 1 wherein updating at least one of the DL status or the UL status comprises:
    buffering a received or transmitted SID frame or a received or transmitted voice packet;
    in response to buffering the received or transmitted voice packet, updating one of the DL status or UL status to indicate the talk period at the BS or at the MS; and
    transmitting the buffered received or transmitted SID frame or the buffered received or transmitted voice packet during the listening interval.

4. The method of claim 3 wherein updating one of the DL status or the UL status at the BS comprises:
    in response to the BS transmitting the voice packet, setting the DL status to a talk status to indicate the talk period; and
    in response to the BS receiving a MS transmitted voice packet, setting the UL status to the talk status.

5. The method of claim 3 wherein updating one of the DL status or the UL status at the MS comprises:
    in response to the MS transmitting the voice packet, setting the DL status to a talk status to indicate the talk period; and
    in response to the MS receiving a BS transmitted voice packet, setting the UL status to the talk status.

6. The method of claim 1 wherein operation in the second PSC mode comprises:
    maintaining the sleep interval and the listening interval according to a second PSM protocol; and
    updating at least one of the DL status or the UL status;
    in response to at least one of the DL status or the UL status indicating the talk period, maintaining the sleep interval and the listening interval according to the second PSM protocol; and
    in response to both of the DL status and the UL status indicating the silence period, exiting the second PSC mode and entering the first PSC mode.

7. The method of claim 6 wherein updating at least one of the DL status or the UL status comprises:
    updating at least one of the DL status or the UL status at the BS or at the MS.

8. The method of claim 7 wherein updating at least one of the DL status or the UL status at the BS comprises:
    in response to the BS transmitting the SID frame, setting the DL status to a silence status to indicate the silence period;
    in response to the BS receiving the SID frame from the MS, setting the UL status to the silence status;
    in response to the BS transmitting a voice packet, setting the DL status to a talk status to indicate the talk period; and
    in response to the BS receiving a voice packet from the MS, setting the UL status to the talk status.

9. The method of claim 7 wherein updating at least one of the DL status or the UL status at the MS comprises:
    in response to the MS receiving the SID frame from the BS, setting the DL status to a silence status to indicate the silence period;
    in response to the MS transmitting the SID frame, setting the UL status to the silence status;
    in response to the MS receiving a voice packet from the BS, setting the DL status to a talk status to indicate the talk period; and
    in response to the MS transmitting a voice packet, setting the UL status to the talk status.

10. The method of claim 1 wherein the first PSC mode supports at least one of a best effort (BE) or a non real-time variable rate (NRT-VR) connection, and the second PSC mode supports at least one of an unsolicited grant service (UGS), a real-time variable rate (RT-VR), or an extended real-time variable rate (ERT-VR) connection.

11. The method of claim 1 wherein the first PSC mode corresponds to a PSC type I according to an IEEE 802.16e standard and the second PSC mode corresponds to a PSC type II according to the IEEE 802.16e standard.

12. An apparatus comprising:
an initializer configured to initialize at least one of a base station (BS) or a mobile station (MS) to a hybrid power saving mode that utilizes a downlink (DL) status and an uplink (UL) status associated with the at least one of the BS or the MS during communication between the BS and the MS, wherein the DL status indicates status of an associated downlink and the UL status indicates status of an associated uplink;
a first controller coupled to the initializer configured to activate a first power-saving class (PSC) mode based on both the DL status and the UL status indicating a silence period, wherein both the DL status and the UL status indicate the silence period when the at least one of the BS or the MS transmits and receives a silence insertion descriptor (SID) frame; and
a second controller coupled to the initializer to activate a second PSC mode based on at least one of the DL status or the UL status indicating a talk period
wherein the first controller is configured to:
maintain a sleep interval and a listening interval according to a first power-saving mode (PSM) protocol;
update at least one of the DL status or the UL status;
in response to both of the DL status and the UL status indicating the silence period, maintain the sleep interval and the listening interval according to the first PSM protocol; and
in response to at least one of the DL status or the UL status indicating the talk period, exit the first PSC mode and communicate with the second controller to activate the second PSC mode.

13. The apparatus of claim 12 wherein the initializer is configured to set both the DL status and the UL status to indicate the talk period in response to both a voice over Internet Protocol (VoIP) and PSM being desired.

14. The apparatus of claim 12 wherein the first controller comprises:
a maintaining module configured to maintain the sleep interval and the listening interval according to the first PSM protocol in response to both the DL status and the UL status indicating the silence period; and
an updater configured to update at least one of the DL status and the UL status.

15. The apparatus of claim 12 wherein the second controller comprises:
a maintaining module configured to maintain the sleep interval and the listening interval according to a second PSM protocol in response to at least one of the DL status or the UL status indicating the talk period; and
an updater configured to update at least one of the DL status and the UL status.

16. The apparatus of claim 14 wherein the updater comprises:
a buffer configured to buffer the SID frame or a voice packet;
a status updater configured to update at least one of the DL status or the UL status at the BS or at the MS in response to the voice packet being buffered; and
a transmitter coupled to the buffer configured to transmit the buffered SID frame or the buffered voice packet during the listening interval.

17. An article of manufacture comprising:
a non-transitory machine-accessible medium including data that, when accessed by a machine, causes the machine to perform operations comprising:
initializing at least one of a base station (BS) or a mobile station (MS) to a hybrid power saving mode that utilizes a downlink (DL) status and an uplink (UL) status associated with the at least one of the BS or the MS during communication between the BS and the MS, wherein the DL status indicates status of an associated downlink and the UL status indicates status of an associated uplink;
entering a first Power Saving Class (PSC) mode based on both the DL status and the UL status indicating a silence period, wherein both the DL status and the UL status indicate the silence period when the at least one of the BS or the MS transmits and receives a silence insertion descriptor (SID) frame; and
entering a second PSC mode based on at least one of the DL status or the UL status-indicating a talk period,
wherein operation in the first PSC mode comprises:
maintaining a sleep interval and a listening interval according to a first power-saving mode (PSM) protocol;
updating at least one of the DL status or the UL status;
in response to both of the DL status and the UL status indicating the silence period, maintaining the sleep interval and the listening interval according to the first PSM protocol; and
in response to at least one of the DL status or the UL status indicating the talk period, exiting the first PSC mode and entering the second PSC mode.

18. The article of manufacture of claim 17 wherein the data causing the machine to perform initializing comprises data that, when accessed by the machine, causes the machine to perform operations comprising:
determining whether a voice over Internet Protocol (VOIP) is desired;
determining whether a PSM is desired; and
in response to determining that the VOIP is desired and determining that the PSM is desired, setting both the DL status and the UL status to indicate the talk period.

19. The article of manufacture of claim 17 wherein the data causing the machine to perform updating at least one of the DL status or the UL status comprises data that, when accessed by the machine, causes the machine to perform operations comprising:
buffering a received or transmitted SID frame or a received or transmitted voice packet;
in response to buffering the received or transmitted voice packet, updating one of the DL status or UL status to indicate the talk period at the BS or at the MS; and
transmitting the buffered received or transmitted SID frame or the buffered received or transmitted voice packet during the listening interval.

20. The article of manufacture of claim 17 wherein the data causing the machine to perform entering the second PSC mode comprises data that, when accessed by the machine, causes the machine to perform operations comprising:
maintaining the sleep interval and the listening interval according to a second PSM protocol; and
updating at least one of the DL status or the UL status;
in response to at least one of the DL status or the UL status indicating the talk period, maintaining the sleep interval and the listening interval according to the second PSM protocol; and in response to both of the DL status and the UL status indicating the silence period, exiting the second PSC mode and entering the first PSC mode.

21. An apparatus comprising:
   means for initializing at least one of a base station (BS) or a mobile station (MS) to a hybrid power saving mode that utilizes a downlink (DL) status and an uplink (UL) status associated with the at least one of the BS or the MS during communication between the BS and the MS, wherein the DL status indicates status of an associated downlink and the UL status indicates status of an associated uplink;
   means for entering and operating in a first Power Saving Class (PSC) mode based on both the DL status and the UL status indicating a silence period, wherein both the DL status and the UL status indicate the silence period when the at least one of the BS or the MS transmits and receives a silence insertion descriptor (SID) frame; and
   means for entering and operating in a second PSC mode based on at least one of the DL status or the UL status indicating a talk period,
   wherein the means for operating in the first PSC mode comprises:
      means for maintaining a sleep interval and a listening interval according to a first power-saving mode (PSM) protocol; and
      means for updating at least one of the DL status or the UL status;
      means for maintaining the sleep interval and the listening interval according to the first PSM protocol in response to both of the DL status and the UL status indicating the silence period; and
      means for exiting the first PSC mode and entering the second PSC mode in response to at least one of the DL status or the UL status indicating the talk period.

22. The apparatus of claim 21 wherein the means for initializing comprises:
   means for determining whether a voice over Internet Protocol (VoIP) is desired;
   means for determining whether a PSM is desired; and
   means for setting both the DL status and the UL status to indicate the talk period in response to determining that the VOIP is desired and determining that the PSM is desired.

23. The apparatus of claim 21 wherein the means for updating at least one of the DL status or the UL status comprises:
   means for buffering a received or transmitted SID frame or a received or transmitted voice packet;
   means for updating one of the DL status or UL status to indicate the talk period at the BS or at the MS in response to buffering the received or transmitted voice packet; and
   transmitting the buffered received or transmitted SID frame or the buffered received or transmitted voice packet during the listening interval.

24. The apparatus of claim 23 wherein the means for updating at least one of the DL status or the UL status at the BS comprises:
   means for setting the DL status to a talk status to indicate the talk period in response to the BS transmitting the voice packet; and
   means for setting the UL status to the talk status in response to the BS receiving a MS transmitted voice packet.

25. The apparatus of claim 23 wherein the means for updating at least one of the DL status or the UL status at the MS comprises:
   means for setting the DL status to a talk status to indicate the talk period in response to the MS transmitting the voice packet; and
   means for setting the UL status to the talk status in response to the MS receiving a BS transmitted voice packet.

26. The apparatus of claim 21 wherein the means for operating in the second PSC mode comprises:
   means for maintaining the sleep interval and the listening interval according to a second PSM protocol; and
   means for updating at least one of the DL status or the UL status;
   means for maintaining the sleep interval and the listening interval according to the second PSM protocol in response to at least one of the DL status or the UL status indicating the talk period; and
   means for exiting the second PSC mode and entering the first PSC mode in response to both of the DL status and the UL status indicating the silence period.

27. The apparatus of claim 26 wherein the means for updating at least one of the DL status or the UL status comprises:
   means for updating at least one of the DL status or the UL status at the BS or at the MS.

28. The apparatus of claim 27 wherein the means for updating at least one of the DL status or the UL status at the BS comprises:
   means for setting the DL status to a silence status to indicate the silence period in response to the BS transmitting the SID frame;
   means for setting the UL status to the silence status in response to the BS receiving the SID frame from the MS;
   means for setting the DL status to a talk status to indicate the talk period in response to the BS transmitting a voice packet; and
   means for setting the UL status to the talk status in response to the BS receiving a voice packet from the MS.

29. The apparatus of claim 27 wherein the means for updating one of the DL and UL statuses at the MS comprises:
   means for setting the DL status to a silence status to indicate the silence period in response to the MS receiving the SID frame from the BS;
   means for setting the UL status to the silence status in response to the MS transmitting the SID frame;
   means for setting the DL status to a talk status to indicate the talk period in response to the MS receiving a voice packet from the BS; and
   means for setting the UL status to the talk status in response to the MS transmitting a voice packet.

30. The apparatus of claim 21 wherein the first PSC mode supports at least one of a best effort (BE) or a non real-time variable rate (NRT-VR) connection, and the second PSC mode supports at least one of an unsolicited grant service (UGS), a real-time variable rate (RT-VR), or an extended real-time variable rate (ERT-VR) connection.

31. The apparatus of claim 21 wherein the first PSC mode corresponds to a PSC type I according to an IEEE 802.16e standard and the second PSC mode corresponds to a PSC type II according to the IEEE 802.16e standard.

32. A mobile station (MS) comprising:
   a radio frequency (RF) transmitter and receiver configured to transmit and receive radio signals to and from a base station (BS) in an orthogonal frequency division multiple access (OFDMA) wireless communication; and
   a power saving controller, the power saving controller comprising:
      an initializer configured to initialize the MS to a hybrid power saving mode that utilizes a downlink (DL) status and an uplink (UL) status, wherein the DL status indicates status of an associated downlink and the UL status indicates status of an associated uplink, a first controller coupled to the initializer configured to activate a first power-saving class (PSC) mode based on both the DL status and the UL status indicating a silence period, wherein both the DL status and the UL status indicate the silence period when the MS transmits and receives a silence insertion descriptor (SID) frame; and a second controller coupled to the initializer configured to activate a second PSC mode-based on at least one of the DL status or the UL status indicating a talk period, wherein the first controller is configured to:
    maintain a sleep interval and a listening interval according to a first power-saving mode (PSM) protocol;
    update at least one of the DL status or the UL status;
    in response to both of the DL status and the UL status indicating the silence period, maintain the sleep interval and the listening interval according to the first PSM protocol; and
    in response to at least one of the DL status or the UL status indicating the talk period, exit the first PSC mode and communicate with the second controller to activate the second PSC mode.

33. The MS of claim 32 wherein the first controller comprises:
- a maintaining module configured to maintain the sleep interval and the listening interval according to the first PSM protocol in response to both the DL status and the UL status indicating the silence period; and
- an updater configured to update one of the DL and UL statuses.

34. The MS of claim 32 wherein the second controller comprises:
- a maintaining module configured to maintain the sleep interval and the listening interval according to a second PSM protocol in response to at least one of the DL status or the UL status indicating the talk period; and
- an updater configured to update one of the DL and UL statuses.

* * * * *